United States Patent
Kato

(10) Patent No.: US 10,425,307 B2
(45) Date of Patent: Sep. 24, 2019

(54) COMMUNICATION SYSTEM, TRANSMITTING DEVICE AND RECEIVING DEVICE

(71) Applicant: Panasonic Intellectual Property Management Co., Ltd., Osaka (JP)

(72) Inventor: Osamu Kato, Fukuoka (JP)

(73) Assignee: Sun Patent Trust, New York, NY (US)

( * ) Notice: Subject to any disclaimer, the term of this patent is extended or adjusted under 35 U.S.C. 154(b) by 118 days.

(21) Appl. No.: 15/538,145

(22) PCT Filed: Jan. 12, 2016

(86) PCT No.: PCT/JP2016/000103
§ 371 (c)(1),
(2) Date: Jun. 20, 2017

(87) PCT Pub. No.: WO2016/121303
PCT Pub. Date: Aug. 4, 2016

(65) Prior Publication Data
US 2018/0019935 A1  Jan. 18, 2018

(30) Foreign Application Priority Data

Jan. 26, 2015 (JP) .................. 2015-012567
Jan. 26, 2015 (JP) .................. 2015-012568

(51) Int. Cl.
*H03M 13/00* (2006.01)
*H04L 29/14* (2006.01)
(Continued)

(52) U.S. Cl.
CPC ........ *H04L 43/0847* (2013.01); *H04L 1/0041* (2013.01); *H04L 1/12* (2013.01);
(Continued)

(58) Field of Classification Search
CPC ..... H04L 1/0041; H04L 1/1819; H04L 1/201; H03M 13/19; H03M 13/23; H04B 3/234;
(Continued)

(56) References Cited

U.S. PATENT DOCUMENTS 8,839,078 B2* 9/2014 Abu-Surra ........ H03M 13/2707
714/758
9,106,265 B2* 8/2015 Nicolas ................. H03M 13/27
(Continued)

FOREIGN PATENT DOCUMENTS

| JP | 2002-247063 A | 8/2002 |
|---|---|---|
| JP | 2004-517534 A | 6/2004 |

(Continued)

OTHER PUBLICATIONS

International Search Report, dated Mar. 8, 2016, for corresponding International Application No. PCT/JP2016/000103, 3 pages.

(Continued)

*Primary Examiner* — Edan Orgad
*Assistant Examiner* — Vanneilian Lalchinthang
(74) *Attorney, Agent, or Firm* — Seed IP Law Group LLP

(57) ABSTRACT

A transmitting device includes a packet generator that generates k (k: an integer of 2 or more) number of data packets as transmission targets, a coder that generates n (>k) number of coded packets by coding the k number of data packets, a transmission controller that instructs that the coded packets are to be transmitted or the transmission of the coded packets is to be interrupted, and a first transmitter that sequentially transmits the coded packets in response to a transmission instruction from the transmission controller. A receiving device includes a receiver that receives the coded packets, a decoder that decodes the coded packets, and a second transmitter that transmits a transmission interruption request packet to the transmitting device in a case where a first
(Continued)

condition in which the coded packets are able to be decoded is satisfied. The transmission controller causes the first transmitter to interrupt the transmission of the coded packets in response to the transmission interruption request packet.

14 Claims, 26 Drawing Sheets

(51) Int. Cl.
| | | |
|---|---|---|
| H04L 12/06 | (2006.01) | |
| H04L 12/26 | (2006.01) | |
| H04L 29/08 | (2006.01) | |
| H04L 1/00 | (2006.01) | |
| H04L 1/12 | (2006.01) | |
| H04L 29/06 | (2006.01) | |
| H04N 21/2383 | (2011.01) | |
| H04L 12/801 | (2013.01) | |
| H04L 12/823 | (2013.01) | |

(52) U.S. Cl.
CPC ............ *H04L 29/08* (2013.01); *H04L 65/602* (2013.01); *H04L 47/18* (2013.01); *H04L 47/32* (2013.01); *H04L 69/329* (2013.01); *H04N 21/2383* (2013.01)

(58) Field of Classification Search
CPC ..... H04W 40/02; H04W 12/08; H04W 24/02; H04M 7/0057
USPC .......................................................... 370/231
See application file for complete search history.

(56) References Cited

U.S. PATENT DOCUMENTS

| | | | |
|---|---|---|---|
| 2002/0080802 A1 | 6/2002 | Sachs et al. | |
| 2007/0204196 A1* | 8/2007 | Watson | H04L 1/0041 |
| | | | 714/751 |
| 2010/0281339 A1* | 11/2010 | Myers | H03J 7/02 |
| | | | 714/758 |
| 2012/0327761 A1* | 12/2012 | Obuchi | H04L 1/1819 |
| | | | 370/216 |
| 2013/0117638 A1* | 5/2013 | Yang | H03M 13/05 |
| | | | 714/776 |
| 2014/0016472 A1* | 1/2014 | Porat | H04W 28/0231 |
| | | | 370/235 |
| 2015/0030005 A1* | 1/2015 | Sambhwani | H04W 52/325 |
| | | | 370/335 |
| 2016/0062822 A1* | 3/2016 | Miyazaki | G06F 11/1004 |
| | | | 714/807 |

FOREIGN PATENT DOCUMENTS

| | | |
|---|---|---|
| JP | 2006-311595 A | 11/2006 |
| JP | 2013-527705 A | 6/2013 |
| WO | 2002/052862 A2 | 7/2002 |
| WO | 2011/139762 A2 | 11/2011 |

OTHER PUBLICATIONS

Masami Ueda, "Development of FEC Libraries for Compensation of Packet Loss in Mobile Content Delivery," SEI technical review, vol. 173, Jul. 2008, 8 pages. (With Partial English Translation).
Joki Heidi, Modeling of DVB-H Link Layer, [Online] May 10, 2005, p. 1-35, URL, http://www.netlab.tkk.fi/opetus/s38310/04-05/Kalvot_04-05/Joki_100505.ppt.

* cited by examiner

FIG. 9

| RECEIVING TERMINAL | PACKET # SATISFYING THAT $P_{OK} \geq k'$ |
|---|---|
| 1(20B1) | 108 |
| 2(20B2) | 119 |
| 3(20B3) | 105 |
| 4(20B4) | 120 |
| ⋮ | ⋮ |
| 77(20B77) | 183 |
| 78(20B78) | 145 |
| 79(20B79) | NON-SATISFACTION (LESS THAN 200) |
| 80(20B80) | NON-SATISFACTION (LESS THAN 200) |

FIG. 14

| RECEIVING TERMINAL | PACKET # SATISFYING THAT $P_{OK} \geq k'$ | PACKET # SATISFYING THAT $P_{NG} \geq n - k' + 1$ |
|---|---|---|
| 1(20C1) | 110 | --- |
| 2(20C2) | 118 | --- |
| 3(20C3) | 107 | --- |
| 4(20C4) | 120 | --- |
| 5(20C5) | 131 | --- |
| 6(20C6) | 125 | --- |
| 7(20C7) | 128 | --- |
| 8(20C8) | 150 | --- |
| 9(20C9) | 141 | --- |
| ⋮ | ⋮ | ⋮ |
| 74(20C74) | 188 | --- |
| 75(20C75) | 180 | --- |
| 76(20C76) | --- | 175 |
| 77(20C77) | --- | 189 |
| 78(20C78) |  | 125 |
| 79(20C79) |  | 96 |
| 80(20C80) |  | 110 |

FIG. 23

| RECEIVING TERMINAL | PACKET #i SATISFYING THAT $P_{NG} \geq n - k' + 1$ |
|---|---|
| 1 | NON-SATISFACTION (LESS THAN 200) |
| 2 | NON-SATISFACTION (LESS THAN 200) |
| 3 | NON-SATISFACTION (LESS THAN 200) |
| 4 | 197 |
| ⋮ | ⋮ |
| 77 | 165 |
| 78 | 121 |
| 79 | 96 |
| 80 | 103 |

COMMUNICATION SYSTEM, TRANSMITTING DEVICE AND RECEIVING DEVICE

TECHNICAL FIELD

The present disclosure relates to a communication system, a transmitting device, and a receiving device which transmit or receive packets generated by adding error correction codes to information data as a transmission target.

BACKGROUND ART

In recent years, a market in which high-quality contents (for example, video data) are delivered to mobile terminals with extensive spread of mobile terminals (for example, mobile phones) and acceleration of network lines has been expanded. In the delivery of such contents, there are some cases where a packet loss or a reception error occurs due to a change (for example, presence of noise) of a surrounding communication environment during the delivery of the contents.

In an application (for example, application for data streaming) requiring real-time capabilities, if the Transmission Control Protocol (TCP) that allows Automatic Repeat Request (ARQ) at Layer 4 (transport layer) of the Open Systems Interconnection (OSI) reference model is used, since a delay time becomes long, TCP is not suitable, and thus, there are many cases where the User Datagram Protocol (UDP) is used. However, even though the packet loss or the reception error occurs, since UDP does not allow the re-transmission of packets, the quality of video data is easily deteriorated in packet communication in a network line such as a wireless line having a high line error rate. There are some cases where since packets are discarded in the middle of a transmission path due to congestion even in a wired line, the packets do not reach a receiving side, and the quality of the video data is similarly deteriorated.

Thus, since the contents are restored on the receiving side, an application layer forward error correction (FEC) technology for performing error correction coding on data of the content at Layer 7 (application layer) of the OSI reference model has been known (see, for example, NPL 1). The application layer FEC technology is a technology for restoring the contents without re-transmitting packets by previously coding the data of the content to generate the packets at the application layer on a transmitting side and decoding the packets on the receiving side. In NPL 1, DF raptor codes are used as an example of the application layer FEC technology.

CITATION LIST

Non-Patent Literature

NPL 1: Masami Ueda, "Development of FEC Libraries for Compensation of Packet Loss in Mobile Content Delivery", SEI technical review, Vol. 173, July 2008, pp. 84-90

SUMMARY OF THE INVENTION

According to the present disclosure, there is provided a communication system in which a transmitting device and at least one receiving device are connected to each other. The transmitting device includes a packet generator that generates k (k: an integer of 2 or more) number of data packets as transmission targets, a coder that generates n (>k) number of coded packets by coding the k number of generated data packets, a transmission controller that instructs that the coded packets are to be transmitted or the transmission of the coded packets is to be interrupted, and a first transmitter that sequentially transmits the generated coded packets in response to a transmission instruction from the transmission controller. The receiving device includes a receiver that receives the transmitted coded packets, a decoder that decodes the received coded packets, and a second transmitter that transmits a transmission interruption request packet for requesting transmission interruption of the coded packets to the transmitting device in a case where a first condition in which the coded packets are able to be decoded in the decoder is satisfied. The transmission controller causes the first transmitter to interrupt the transmission of the coded packets in response to the transmission interruption request packet.

According to the present disclosure, there is provided a transmitting device of the above-described communication system.

According to the present disclosure, there is provided a receiving device of the above-described communication system.

According to the present disclosure, there is provided a communication system in which a transmitting device and at least one receiving device are connected to each other. The transmitting device includes a packet generator that generates k (k: an integer of 2 or more) number of data packets as transmission targets, a coder that generates n (>k) number of coded packets by coding the k number of generated data packets, a transmission controller that instructs that the coded packets are to be transmitted or the transmission of the coded packets is to be interrupted, and a first transmitter that sequentially transmits the generated coded packets in response to a transmission instruction from the transmission controller. The receiving device includes a receiver that receives the transmitted coded packets, a decoder that decodes the received coded packets, and a second transmitter that transmits a transmission interruption request packet for requesting transmission interruption of the coded packets to the transmitting device in a case where a first condition in which the coded packets are not able to be decoded in the decoder is satisfied. The transmission controller causes the first transmitter to interrupt the transmission of the coded packets in response to the transmission interruption request packet.

According to the present disclosure, there is provided a transmitting device of the above-described communication system.

According to the present disclosure, there is provided a receiving device of the above-described communication system.

BRIEF DESCRIPTION OF DRAWINGS

FIG. 9 is a diagram showing an example of the correspondence between receiving terminals and the number of packets #i satisfying that counter value $P_{OK} \geq k'$.

FIG. 14 is a diagram showing an example of the correspondence between receiving terminals and the number of packets #i satisfying that counter value $P_{OK} \geq k'$ and the number of packets #i satisfying that counter value $P_{NG} \geq n-k'+1$.

FIG. 23 is a diagram showing an example of the correspondence between receiving terminals and the number of packets #i satisfying that counter value $P_{NG} \geq (n-k'+1)$.

DESCRIPTION OF EMBODIMENTS

Problems in the related art will be simply described before exemplary embodiments of the present disclosure are described. NPL 1 describes that packets acquired by coding data (for example, a transmission time of 60 seconds) of an original content to a double size by using an application layer FEC technology are transmitted over 120 seconds and the data of the content is able to be normally received even though radio waves are interrupted for an arbitrary time of 57 seconds out of the transmission time of 120 seconds.

Here, at an application requiring real-time capabilities described above, if all the packets acquired by coding the data of the content to the double size are transmitted as in NPL 1, there are some cases where the transmission amount of packets becomes excessive in view of the characteristics of the application layer FEC technology, and there is a problem that the transmission amount of packets in a communication transmission path is uselessly increased.

The present disclosure has been made in order to solve the problem, and it is an object of the present disclosure to provide a communication system, a transmitting device, and a receiving device which suppress an increase in a packet transmission amount in a communication transmission path by controlling the transmission amount of packets on which error correction coding is performed by an application requiring real-time capabilities depending on a state of the communication transmission path.

Figure 1:
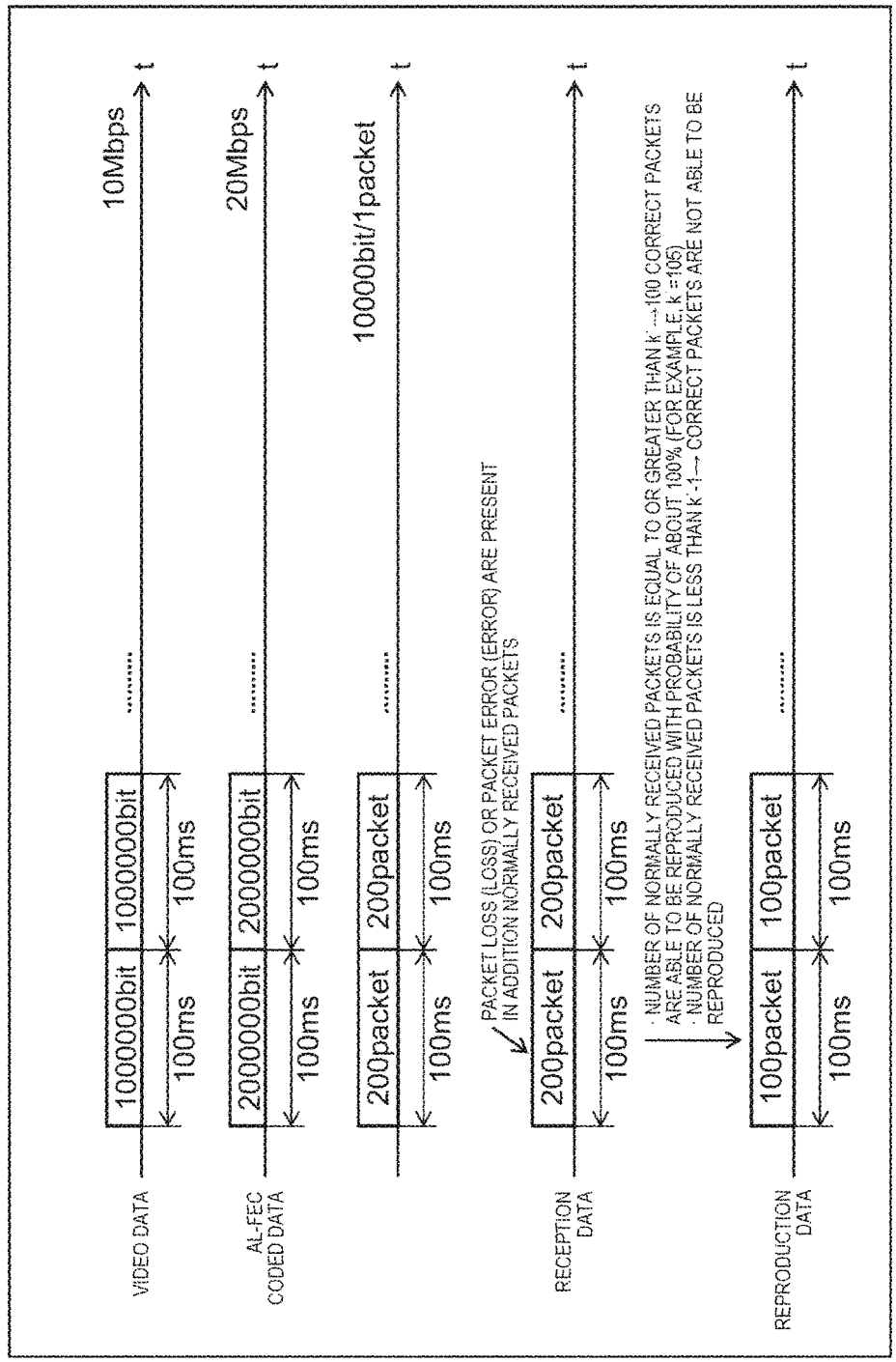
FIG. 1 is an explanatory diagram of problems of the related art in a case where AL-FEC is performed on video data and the video data is transmitted.

A background of the details of the exemplary embodiments will be initially described with reference FIG. 1 before the exemplary embodiments in which a communication system, a transmitting device, and a receiving device according to the present disclosure are specifically disclosed are described. FIG. 1 is an explanatory diagram of problems of the related art in a case where AL-FEC is performed on video data and the video data is transmitted. In the following description, AL-FEC means that an FEC process is performed as an example of error correction coding at an application layer (Layer 7).

Initially, a transmitting side performs coding (for example, forward error correction (FEC)) on k packets of video data as an example of coding of data (for example, video data (the same applies in later occurrences)) as a transmission target at the application layer, generates n (n=k+m) (all n, k, and m are integers of 1 or more) number of coded packets, and transmits the generated coded packets. In a case where k' (k' is equal to k or is slightly greater than k) number of arbitrary packets out of the n packets are normally received (that is, in a case where there is no packet loss or reception error), a receiving side is able to correctly restore original video data. For example, raptor codes are known as codes used in the error correction coding process. Hereinafter, the raptor codes are used as the example of the error correction codes of the data at the application layer for the sake of convenience in the description, but the error correction codes are not limited to the raptor codes.

A time chart related to transmission of video data from the transmitting side is illustrated in a topmost row of FIG. 1, time charts related to transmission of packets (coded packets) and data (hereinafter, referred to as "AL-FEC coded data") on which the error correction coding is performed at the application layer are illustrated in second and third rows from the top, a time chart related to reception of reception data (coded packets) on the receiving side is illustrated in a second row from the bottom, and a time chart related to reproduction of video data (reproduction data) acquired by decoding the AL-FEC coded data on the receiving side is illustrated in a bottommost row.

Hereinafter, an example in which wireless communication is used as a communication form between the transmitting side and the receiving side will be described, and it is assumed that k=100, m=100, n=200, and k'=105 for the sake of convenience in the description. That is, since a state of a communication transmission path in the wireless communication varies with time, it is necessary to set a value of k to be larger than a value of n in order to perform communication of high-quality video data.

In FIG. 1, since a transmission rate of the video data is 10 Mbps (that is, 1,000,000 bits are transmitted for 100 ms) and a transmission rate of the AL-FEC coded data is 20 Mbps, 200 packets (that is, packets (hereinafter, referred to as "coded packets") including the AL-FEC code data) for 100 ms are transmitted from the transmitting side. The receiving side receives the 200 coded packets for 100 ms, but the 200 coded packets include the coded packets in which a packet loss (LOSS) or a packet error (ERROR) occurs in addition to the coded packets which are normally received.

In a case where the transmitting side uses the raptor codes in the error correction coding at the application layer, if the number of coded packets which are normally received is equal to or greater than k', since the receiving side is able to correctly decode coded packets with a probability of almost about 100%, the receiving side is able to correctly reproduce video data corresponding to 100 packets. Meanwhile, if the number of coded packets which are normally received is equal to or less than (k'−1), the receiving side is not able to correctly decode the coded packets, the receiving side is not able to correctly reproduce the video data corresponding to 100 packets. That is, the quality of the video data is deteriorated like a case where the video is distorted and reproduced.

Incidentally, in a case where the state of the communication transmission path between the transmitting side and the receiving side is favorable and a normal reception rate of the coded packets is considerably higher than k'/n, if next 200 coded packets are transmitted after all n (for example, 200) number of coded packets are transmitted from the transmitting side, since the transmission amount of coded packets from the transmitting side is excessively increased, there is a problem that such a case is not efficient since the transmission amount of the coded packets in the communication transmission path is uselessly increased.

Thus, in the following exemplary embodiments, examples of the communication system, the transmitting device, and the receiving device which suppress an increase in a packet transmission amount in a communication transmission path by controlling the transmission amount of packets on which error correction coding is performed by an application requiring real-time capabilities depending on a state of the communication transmission path between the transmitting device and the receiving device will be described.

First Exemplary Embodiment

In a first exemplary embodiment, an example of the communication system applied to unicast communication in which the coded packets of the data are transmitted to one receiving terminal from one transmitting terminal will be described. More specifically, in the communication system according to the present exemplary embodiment, the transmitting terminal generates n (for example, 200) number of coded packets by coding (AL-FEC coding) k (for example, 100) number of packets (data packets) of the video data as the transmission target and transmits sequentially the coded packets to the receiving terminal in response to a transmission instruction of the coded packets in the application requiring the real-time capabilities. The receiving terminal receives the coded packets transmitted from the transmitting terminal, and transmits a reply packet for requesting a transmission interruption of the coded packets to the transmitting terminal in a case where a first condition (see the details to be described below) in which the coded packets are able to be decoded is satisfied. In a case where the reply packet is received, the transmitting terminal determines the transmission interruption of the coded packets, and interrupts the transmission of the coded packets.

Hereinafter, the details of communication system 50 according to the present exemplary embodiment will be described in detail.

Figure 2:
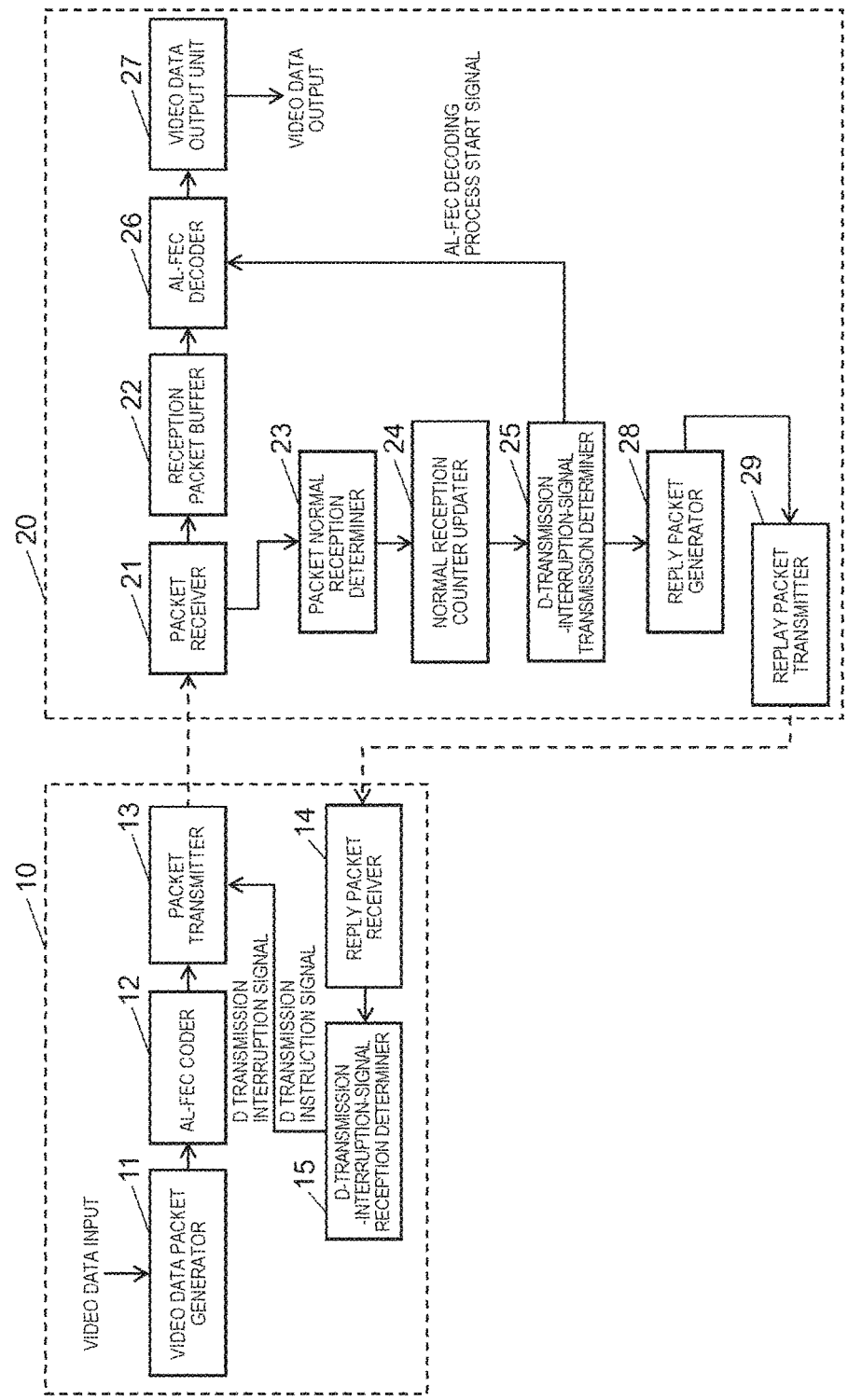
FIG. 2 is a block diagram showing an example of an internal configuration of a transmitting terminal and a receiving terminal of a communication system according to a first exemplary embodiment.

FIG. 2 is a block diagram showing an example of an internal configuration of transmitting terminal 10 and receiving terminal 20 of communication system 50 according to the first exemplary embodiment. An example in which unicast communication between one transmitting terminal 10 and one receiving terminal 20 is used will be described in communication system 50 according to the present exemplary embodiment. Transmitting terminal 10 and receiving terminal 20 are communication devices connected to a network, and are, for example, personal computers (PCs), mobile phones, smartphones, and tablet terminals. The same is true of the following exemplary embodiments. The network may be a network (for example, Long Term Evolution (LTE), 3G, High Speed Packet Access (HSPA), Wi-Fi (registered trademark), or Bluetooth (registered trademark) using wireless communication, or a network (for example, Ethernet (registered trademark)) using wired communication. The same is true of the following exemplary embodiments.

Transmitting terminal 10 shown in FIG. 2 includes video data packet generator 11, AL-FEC coder 12, packet transmitter 13, reply packet receiver 14, and D-transmission-interruption-signal reception determiner 15. Transmitting terminal 10 is not limited to have only the configurations of the respective units shown in FIG. 2. For example, video data packet generator 11, AL-FEC coder 12, and D-transmission-interruption-signal reception determiner 15 are constituted using a central processing unit (CPU), a micro processing unit (MPU), or a digital signal processor (DSP).

Video data packet generator 11 as an example of a packet generator receives data (for example, video data) as the transmission target from a video codec (not shown), generates k number of packets (video data packets) of the video data, and sends the generated packets to AL-FEC coder 12. Hereinafter, an example in which k is 100 will be described.

AL-FEC coder 12 as an example of a coder generates n (>k) number of coded packets by performing the error correction coding on k number of video data packet received from video data packet generator 11 by using the raptor codes at the application layer, and sends the generated packets to packet transmitter 13. Thus, if receiving terminal 20 is able to normally receive k' (<n) (which is slightly greater than k) number of coded packets before n number of coded packets are received, the receiving terminal is able to decode the k number of packets of the video data from k' number of coded packets. Hereinafter, an example in which n is 200 will be described. In other words, the above-described first condition means that 105 (=k') coded packets which are slightly greater than 100 (=k) out of 200 (=n) coded packets are normally received by receiving terminal 20 before 200 coded packets generated by transmitting terminal 10 are transmitted.

Packet transmitter 13 as an example of a first transmitter sequentially transmits the coded packets received from AL-FEC coder 12 while receiving D (data) transmission instruction signal from D-transmission-interruption-signal reception determiner 15. Meanwhile, packet transmitter 13 interrupts the transmission of the coded packets received from AL-FEC coder 12 when the D transmission interruption signal of the coded packets is received from D-transmission-interruption-signal reception determiner 15.

In a case where the reply packet (see below) transmitted from receiving terminal 20 is received, reply packet receiver 14 sends the reply packet to D-transmission-interruption-signal reception determiner 15.

D-transmission-interruption-signal reception determiner 15 as an example of a transmission controller instructs packet transmitter 13 to perform the transmission or the transmission interruption of the coded packets generated by AL-FEC coder 12 for receiving terminal 20. In a case where the reply packet for requesting the transmission interruption of the coded packets from receiving terminal 20 is received by reply packet receiver 14, D-transmission-interruption-signal reception determiner 15 generates the D transmission interruption signal, sends the generated D transmission interruption signal to packet transmitter 13, and interrupts the transmission of the coded packets. Meanwhile, in a case where the reply packet for requesting the transmission interruption of the coded packets from receiving terminal 20 is not received by reply packet receiver 14, D-transmission-interruption-signal reception determiner 15 generates a D transmission instruction signal for transmitting the coded packets, sends the generated D transmission instruction signal to packet transmitter 13, and transmits the coded packets.

Receiving terminal 20 shown in FIG. 2 includes packet receiver 21, reception packet buffer 22, packet normal reception determiner 23, normal reception counter updater 24, D-transmission-interruption-signal transmission determiner 25, AL-FEC decoder 26, video data output unit 27, reply packet generator 28, and reply packet transmitter 29. Receiving terminal 20 is not limited to have only the configurations of the respective units shown in FIG. 2. For example, packet normal reception determiner 23, normal reception counter updater 24, D-transmission-interruption-signal transmission determiner 25, AL-FEC decoder 26, video data output unit 27, and reply packet generator 28 are constituted using the CPU, the MPU, or the DSP.

In a case where the coded packets (that is, packets of the video data on which the error correction coding is performed at the application layer) of the video data transmitted from transmitting terminal 10 are received, packet receiver 21 as an example of a receiver stores the coded packets in reception packet buffer 22, and sends the coded packets to packet normal reception determiner 23.

For example, reception packet buffer 22 is constituted using a random access memory (RAM), and temporarily stores the coded packets received by packet receiver 21. The coded packets stored in reception packet buffer 22 are read by AL-FEC decoder 26 when the coded packets are decoded by AL-FEC decoder 26.

Packet normal reception determiner 23 determines whether or not the coded packets received from packet receiver 21 are normally received. For example, in a case where the coded packets are not received by packet receiver 21 within a predetermined time, packet normal reception determiner 23 determines that the packet loss (LOSS) occurs since the coded packets do not reach receiving terminal 20. For example, packet normal reception determiner 23 determines that the reception error (ERROR) occurs in the coded packets received by the packet receiver 21 through checking (for example, determination of whether calculation values of CRC codes match or do not match (the same is applied later)) using a cyclic redundancy check (CRC) of the coded packets. For example, in a case where the coded packets are received by packet receiver 21 within a predetermined time and an abnormality in the checking using the CRC of the coded packets is not found, packet normal reception determiner 23 determines that the coded packets received from packet receiver 21 are normally received. Packet normal reception determiner 23 sends a determination result related to the reception of the coded packets to normal reception counter updater 24.

Based on the determination result related to the reception of the coded packets from packet normal reception determiner 23, normal reception counter updater 24 as an example of a counter updates counter value $P_{OK}$ indicating that the coded packets received by packet receiver 21 are normally received, and notifies D-transmission-interruption-signal transmission determiner 25 of the latest value of counter value $P_{OK}$. It is assumed that a counter value indicating that packet receiver 21 is not able to normally receive the coded packets is $P_{NG}$. Thus, normal reception counter updater 24 may also update counter value $P_{NG}$ indicating that packet receiver 21 is not able to normally receive the coded packets, and may notify D-transmission-interruption-signal transmission determiner 25 of the latest value of counter value $P_{NG}$.

When the above-described first condition is satisfied (that is, counter value $P_{OK}$ notified from normal reception counter updater 24 reaches 105 (=k')), since 100 (=k) packets of the video data are able to be decoded using 105 (=k') coded packets, D-transmission-interruption-signal transmission determiner 25 as an example of a reception controller sends an AL-FEC decoding process start signal to AL-FEC decoder 26, and instructs reply packet generator 28 to generate the reply packet for requesting the transmission interruption of the coded packets.

If the AL-FEC decoding process start signal from D-transmission-interruption-signal transmission determiner 25 is received at an application layer (Layer 7) of an OSI reference model, AL-FEC decoder 26 as an example of a decoder reads 105 (=k') coded packets from reception packet buffer 22, performs the AL-FEC decoding on the read coded packets, and sends 100 (=k) packets of the video data acquired through the decoding to video data output unit 27.

Video data output unit 27 extracts the video data from 100 (=k) packets of the video data received from AL-FEC decoder 26, and outputs the extracted video data to the video codec (not shown). Thereafter, the video data from the video codec is output to a display (not shown).

In response to an instruction from D-transmission-interruption-signal transmission determiner 25, reply packet generator 28 generates the reply packet for requesting the transmission interruption of the coded packets, and sends the generated reply packet to reply packet transmitter 29.

If the reply packet for requesting the transmission interruption of the coded packets is received from reply packet generator 28, reply packet transmitter 29 as an example of a second transmitter transmits the reply packet to transmitting terminal 10.

Figure 3:
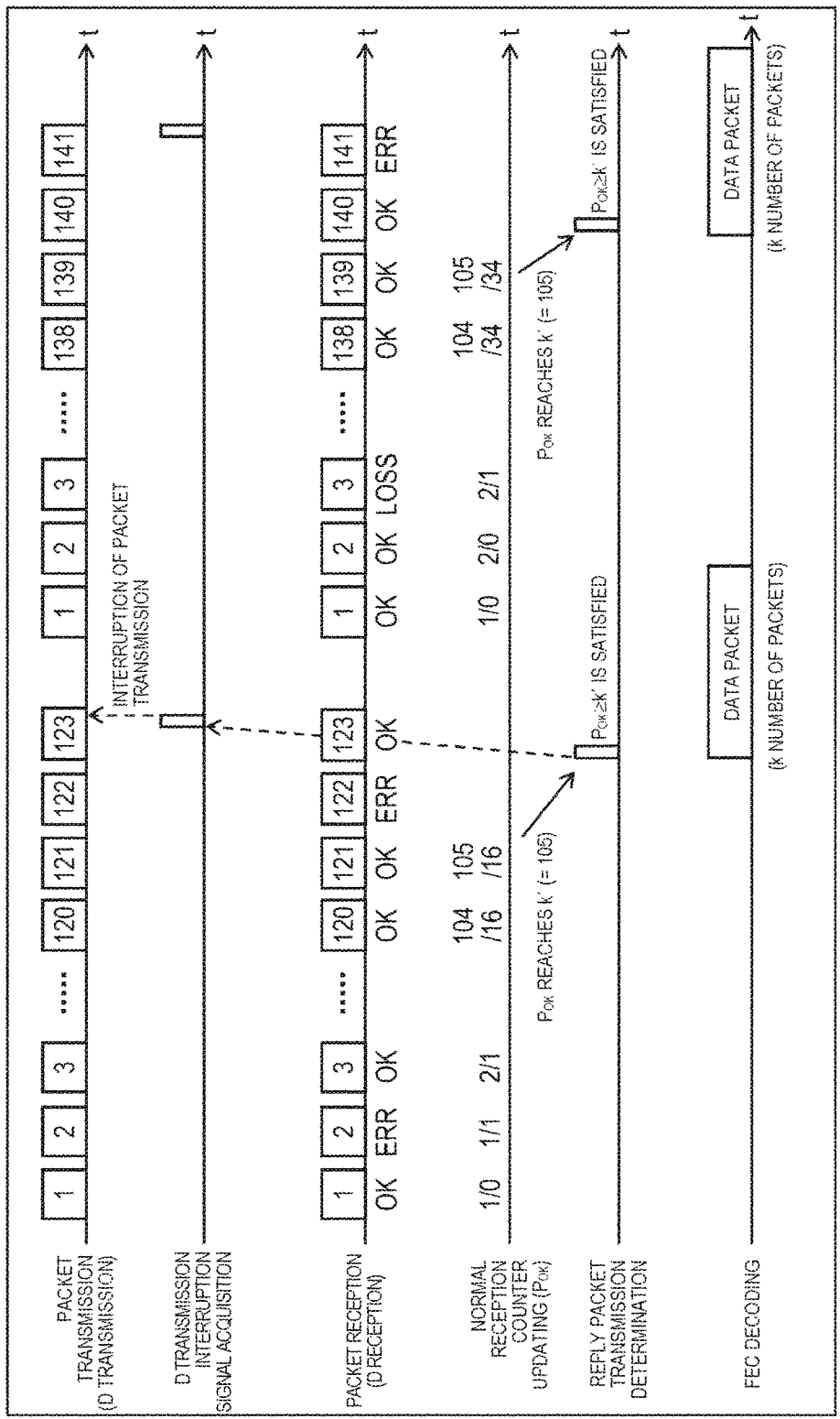
FIG. 3 is an explanatory diagram showing an example of operation outlines of the transmitting terminal and the receiving terminal according to the first exemplary embodiment.

Hereinafter, an operation outline of communication system 50 according to the present exemplary embodiment will be described with reference to FIG. 3. FIG. 3 is an explanatory diagram showing an example of operation outlines of transmitting terminal 10 and receiving terminal 20 according to the first exemplary embodiment.

A time chart related to the transmission of the coded packets transmitted from packet transmitter 13 is illustrated in a topmost row of FIG. 3, a time chart related to the acquisition of the D transmission interruption signal received from D-transmission-interruption-signal reception determiner 15 is illustrated in a second row from the top, a time chart related to the reception of the coded packets in packet receiver 21 is illustrated in a third row from the top, a time chart related to the updating of counter value $P_{OK}$ in normal reception counter updater 24 is illustrated in a fourth row from the top, a time chart related to the determination of the transmission of the reply packet in D-transmission-interruption-signal transmission determiner 25 is illustrated in a fifth row from the top, and a time chart related to the decoding of the packets (data packets) of the video data in AL-FEC decoder 26 is illustrated in a bottommost row.

In FIG. 3, the coded packet which is transmitted in first place is normally received by packet receiver 21, and counter value $P_{OK}$ is updated to 1. The coded packet which is transmitted in second place is not normally received by packet receiver 21, and counter value $P_{OK}$ is maintained at 1. The coded packet which is transmitted in third place is normally received by packet receiver 21, and counter value $P_{OK}$ is updated to 2.

Similarly, it is assumed that the coded packet which is transmitted in 120th place is normally received by packet receiver 21, counter value $P_{OK}$ is updated to 104, and the coded packet which is transmitted in 121st place is normally received by packet receiver 21. In this case, counter value $P_{OK}$ is updated to 105 (=k'), and D-transmission-interruption-signal transmission determiner 25 instructs reply packet generator 28 to transmits the reply packet (that is, a packet for requesting the transmission interruption of the coded packets). Accordingly, receiving terminal 20 transmits the reply packet to transmitting terminal 10.

In response to the reception of the reply packet, D-transmission-interruption-signal reception determiner 15 sends the D transmission interruption signal to packet transmitter 13, and transmitting terminal 10 performs the transmission interruption of the coded packets. Receiving terminal 20 reads 105 (=k') coded packets from reception packet buffer 22 and performs the AL-FEC decoding the read coded packets based on the fact that counter value $P_{OK}$ reaches 105 (=k'). Accordingly, receiving terminal 20 is able to correctly acquire 100 (=k) packets of the video data before the reception of the coded packets is completed without receiving all 200 (=n) coded packets generated by transmitting terminal 10.

Figure 4:
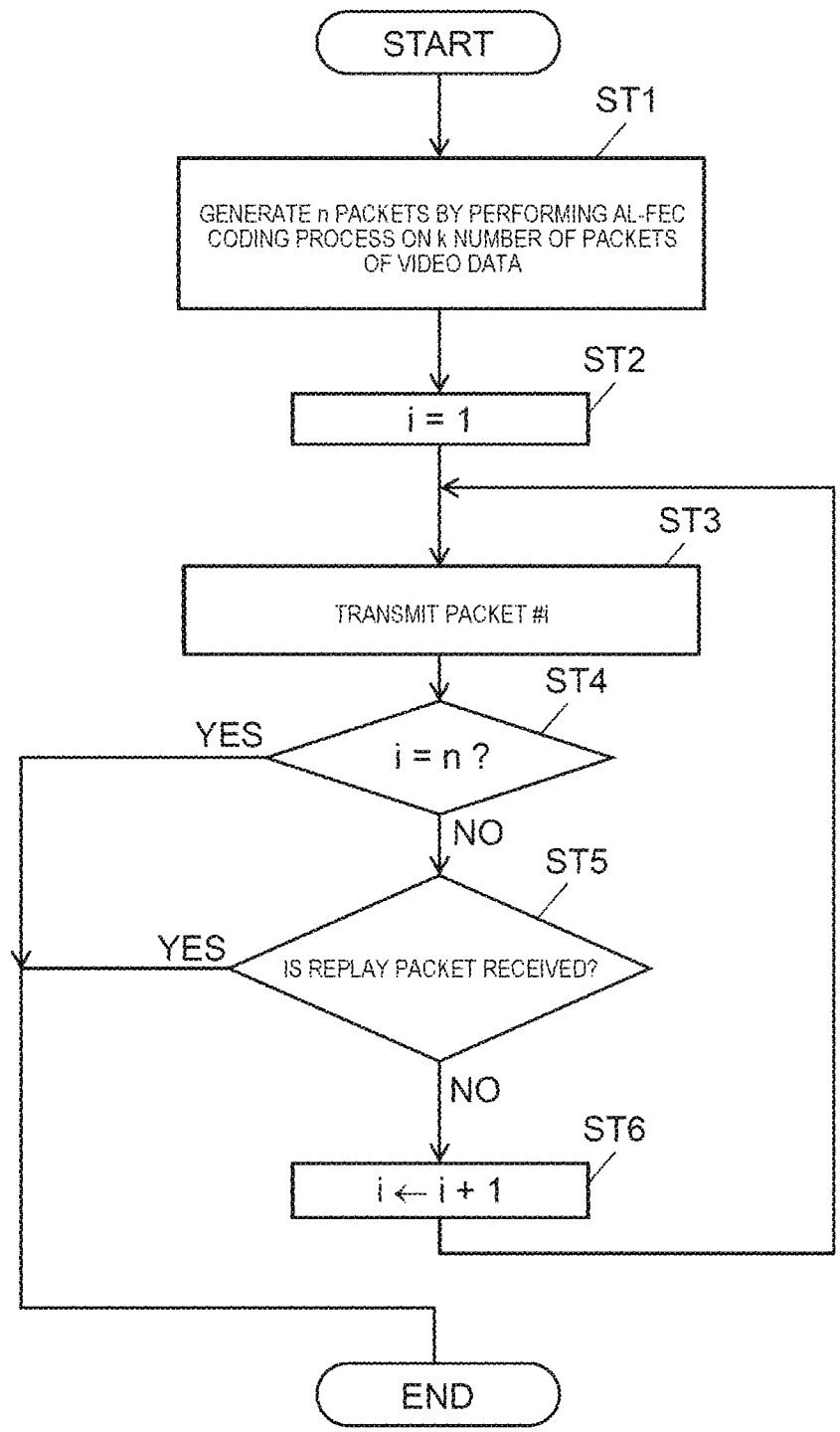
FIG. 4 is a flowchart for describing an example of an operation procedure of the transmitting terminal according to the first exemplary embodiment.

Hereinafter, an operation procedure of transmitting terminal 10 according to the present exemplary embodiment will be described with reference to FIG. 4. FIG. 4 is a flowchart for describing an example of the operation procedure of transmitting terminal 10 according to the first exemplary embodiment. The flowchart shown in FIG. 4 relates to a process of transmitting 2,000,000 bits (200 packets) of coded packets for 100 ms once in a case where a transmission rate is 20 Mbps (in other words, transmitting terminal 10 transmits 2,000,000 bits of coded packets of the video data for 100 ms, for example) (see FIG. 1).

In FIG. 4, video data packet generator 11 generates k number of packets (video data packets) of the data (for example, video data) as the transmission target, and sends the generated packets to AL-FEC coder 12. AL-FEC coder 12 generates n (>k) number of coded packets by performing the error correction coding on k number of video data packets received from video data packet generator 11 by using the raptor codes at the application layer, and sends the generated coded packets to packet transmitter 13 (ST1).

D-transmission-interruption-signal reception determiner 15 initializes a parameter i indicating the transmission order of the coded packets from packet transmitter 13 (ST2, i=1), generates the D transmission instruction signal for transmitting the coded packets, sends the generated D transmission instruction signal to packet transmitter 13, and transmits the coded packets. Packet transmitter 13 transmits a first (i=1) coded packet in response to the D transmission instruction signal from D-transmission-interruption-signal reception determiner 15 (ST3).

In a case where it is satisfied that parameter i=n (for example, 200) (ST4, YES), D-transmission-interruption-signal reception determiner 15 ends the flowchart shown in FIG. 4, and instructs packet transmitter 13 to transmit 200 coded packets for next 100 ms.

Meanwhile, in a case where it is not satisfied that parameter i=n (for example, 200) (ST4, NO), D-transmission-interruption-signal reception determiner 15 determines whether or not the reply packet is received from receiving terminal 20 (ST5).

In a case where it is determined that the reply packet is not received (ST5, NO), D-transmission-interruption-signal reception determiner 15 increments parameter i (ST6), generates the D transmission instruction signal for transmitting the coded packets, sends the generated D transmission instruction signal to packet transmitter 13, and transmits the coded packets.

Meanwhile, in a case where it is determined that the reply packet is received (ST5, YES), D-transmission-interruption-signal reception determiner 15 generates the D transmission interruption signal, sends the generated D transmission interruption signal to packet transmitter 13, and interrupts the transmission of the coded packets.

Figure 5:
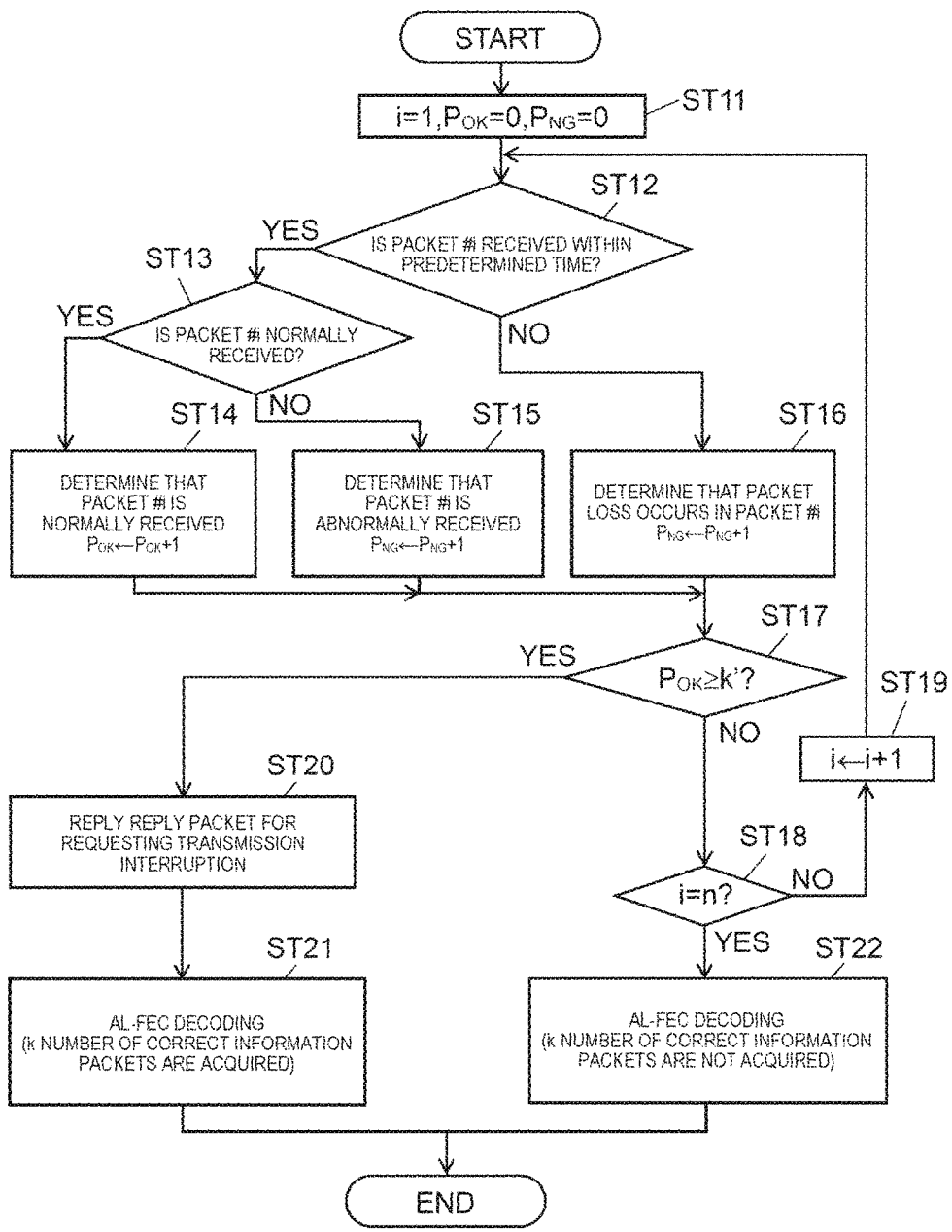
FIG. 5 is a flowchart for describing an example of an operation procedure of the receiving terminal according to the first exemplary embodiment.

Hereinafter, an operation procedure of receiving terminal 20 according to the present exemplary embodiment will be described with reference to FIG. 5. FIG. 5 is a flowchart for describing an example of the operation procedure of receiving terminal 20 according to the first exemplary embodiment. The flowchart shown in FIG. 5 relates to a process of receiving 2,000,000 bits (200 packets) of coded packets for 100 ms once in a case where a transmission rate is 20 Mbps (in other words, transmitting terminal 10 transmits 2,000,000 bits of coded packets of the video data for 100 ms, for example) (see FIG. 1).

In FIG. 5, D-transmission-interruption-signal transmission determiner 25 initializes parameter i indicating the transmission order of the coded packets from packet transmitter 13 (ST11, i=1), and sets counter value $P_{OK}$ indicating that packet receiver 21 normally receives the coded packets and counter value $P_{NG}$ indicating that packet receiver 21 is not able to normally receive the coded packets to be zero (ST11, $P_{OK}=P_{NG}=0$). In FIG. 5, the coded packet which is transmitted in i-th place is described as "packet #i" for the sake of convenience, and the same is true of the following exemplary embodiments.

In a case where packet receiver 21 receives the coded packet (packet #i) within a predetermined time (ST12, YES), packet normal reception determiner 23 determines whether or not the received coded packet (packet #i) is normally received, and sends the determination result to normal reception counter updater 24 (ST13). In a case where it is determined that the coded packet (packet #i) is normally received (ST13, YES), normal reception counter updater 24 increments counter value $P_{OK}$ set in step ST11 (ST14). Meanwhile, in a case where it is determined that the coded packet (packet #i) is not normally received (ST13, NO), since the reception error of the coded packet occurs (for example, the CRC checks do not match), normal reception counter updater 24 increments counter value $P_{NG}$ set in step ST11 (ST15).

Meanwhile, in a case where packet receiver 21 does not receive the coded packet (packet #i) within a predetermined time (for example, 0.5 ms (=100 ms/200 packets)) (ST12, NO), packet normal reception determiner 23 determines that the packet loss (LOSS) occurs since the coded packet does not reach receiving terminal 20, and sends the determination result to normal reception counter updater 24. Normal reception counter updater 24 increments counter value $P_{NG}$ set in step ST11 (ST16).

In a case where counter value $P_{OK}$ is equal to or greater than k' (=105) (ST17, YES), since receiving terminal 20 is able to perform the AL-FEC decoding on k number of packets of the video data by using k' number of coded packets at this point of time and it is not necessary to transmit k' number of coded packets or more from transmitting terminal 10, D-transmission-interruption-signal transmission determiner 25 instructs reply packet generator 28 to transmit the reply packet for requesting the transmission interruption of the coded packets. In response to an instruction from D-transmission-interruption-signal transmission determiner 25, reply packet generator 28 generates the reply packet for requesting the transmission interruption of the coded packets, and sends the generated reply packet to reply packet transmitter 29. If the reply packet for requesting the transmission interruption of the coded packets is received from reply packet generator 28, reply packet transmitter 29 transmits the reply packet to transmitting terminal 10 (ST20). D-transmission-interruption-signal transmission determiner 25 sends the AL-FEC decoding process start signal to AL-FEC decoder 26. If the AL-FEC decoding process start signal from D-transmission-interruption-signal transmission determiner 25 is received at the application layer, AL-FEC decoder 26 reads 105 (=k') coded packets from reception packet buffer 22, performs the AL-FEC decoding on the read coded packets, and sends 100 (=k) packets of the video data acquired through the decoding to video data output unit 27 (ST21).

Meanwhile, in a case where counter value $P_{OK}$ is not equal to or greater than k' (=105) (that is, is less than k') (ST17, NO), if parameter i does not match n (=200) indicating the maximum number of coded packets to be transmitted (ST18, NO), D-transmission-interruption-signal transmission determiner 25 increments parameter i (ST19). After step ST19, the process of receiving terminal 20 returns to step ST12.

Meanwhile, in a case where counter value $P_{OK}$ is not equal to or greater than k' (=105) (that is, is less than k') (ST17, NO) and also in a case where parameter i matches n (=200) indicating the maximum number of coded packets to be transmitted (ST18, YES), D-transmission-interruption-signal transmission determiner 25 sends the AL-FEC decoding process start signal to AL-FEC decoder 26. In this case, since only the coded packets of less than k' are acquired, AL-FEC decoder 26 decodes k number of packets of the video data (ST22), and is not able to correctly decode the packets. Accordingly, the quality of the video data is deteriorated like a case where the video data in a section of 100 ms during which 200 coded packets are transmitted is distorted and output on receiving terminal 20.

Accordingly, in communication system 50 according to the present exemplary embodiment, transmitting terminal 10 generates n (for example, 200) coded packets by performing coding (AL-FEC coding) on k (for example, 100) packets (data packets) of the video data as the transmission target in the application requiring the real-time capabilities, and sequentially transmits the coded packets to receiving terminal 20 in response to a transmission instruction of the coded packets from D-transmission-interruption-signal reception determiner 15. Receiving terminal 20 receives the coded packets transmitted from transmitting terminal 10, and transmits the reply packet for requesting the transmission interruption of the coded packets to transmitting terminal 10 in a case where a first condition (that is, in which k' (for example, 105) number of coded packets are normally received) in which the coded packets are able to be decoded in AL-FEC decoder 26 is satisfied. In a case where the reply packet is received, transmitting terminal 10 determines the transmission interruption of the coded packets in D-transmission-interruption-signal reception determiner 15, and causes packet transmitter 13 to interrupt the transmission of the coded packets.

Accordingly, since communication system 50 can control the transmission amount of packets on which the AL-FEC coding is performed by the application requiring the real-time capabilities depending on the state of the communication transmission path of the unicast communication between transmitting terminal 10 and receiving terminal 20, the communication system can suppress an increase in the packet transmission amount in the communication transmission path. That is, in a case where the reply packet for requesting the transmission interruption of the coded packets is received from receiving terminal 20 before all n (for example, 200) number of coded packets are transmitted, since transmitting terminal 10 interrupts the transmission of the coded packets without transmitting all n number of coded packets, it is possible to reduce the transmission amount of coded packets, and it is possible to effectively use a wireless band.

In communication system 50, receiving terminal 20 counts the number of normally received coded packets, and receiving terminal 20 is able to correctly decode k (for example, 100) number of packets of the video data by using k' (for example, 105) number of coded packets in a case where the counted value is k' (for example, 105) which is slightly greater than k (for example, 100), the receiving terminal transmits the reply packet for requesting the transmission interruption of the coded packets from reply packet transmitter 29. Accordingly, for example, in a case where the raptor codes are used in the AL-FEC coding, receiving terminal 20 can suppress the increase in the transmission amount of coded packets transmitted from transmitting terminal 10.

In communication system 50, receiving terminal 20 instructs AL-FEC decoder 26 to decode k (for example, 100) number of packets (data packets) of the video data using k' (for example, 105) number of coded packets which are normally received. Accordingly, in a case where the number of coded packets which are normally received reaches k' which is slightly greater than k, since k number of packets of the video data is able to be decoded, there is no case where receiving terminal 20 receives all n (for example, 200) number of coded packets generated by transmitting terminal 10. Accordingly, it is possible to reduce a processing load of the decoding in receiving terminal 20, and it is possible to reduce a time required until the video data is output. As a result, it is possible to contribute to data output in the application requiring the real-time capabilities.

Modification Example of First Exemplary Embodiment

In a modification example (hereinafter, referred to as a "first modification example") of the first exemplary embodiment, an example of communication system 50A in which the reply packet is transmitted to the transmitting terminal also in a case where counter value $P_{NG}$ indicating that the receiving terminal is not able to normally receive the coded packets reaches a predetermined value (for example, n−k'+1) in addition to a case where counter value $P_{OK}$ indicating that the receiving terminal normally receives the coded packets reaches a predetermined value (for example, k') will be described.

Figure 6:
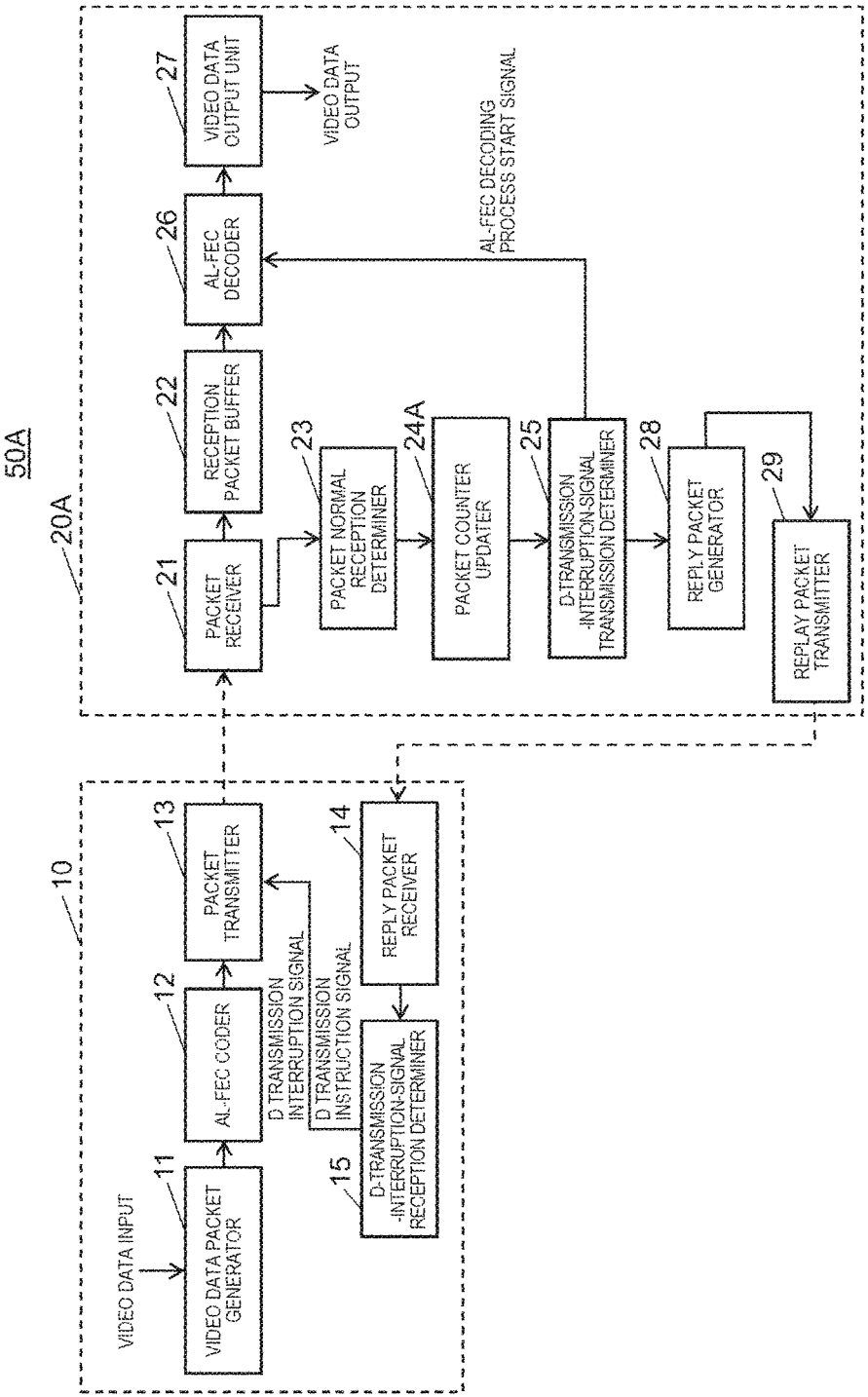
FIG. 6 is a block diagram showing an example of an internal configuration of a transmitting terminal and a receiving terminal of a communication system according to a modification example of the first exemplary embodiment.

FIG. 6 is a block diagram showing an example of an internal configuration of transmitting terminal 10 and receiving terminal 20A of communication system 50A according to the modification example of the first exemplary embodiment. Among the respective units of transmitting terminal 10 and receiving terminal 20A shown in FIG. 6, the units having the same configurations and operations as those of the respective units of transmitting terminal 10 and receiving terminal 20 shown in FIG. 2 will be same reference marks, and the description thereof will be omitted. Different contents will be described.

Receiving terminal 20A shown in FIG. 6 includes packet receiver 21, reception packet buffer 22, packet normal reception determiner 23, packet counter updater 24A, D-transmission-interruption-signal transmission determiner 25, AL-FEC decoder 26, video data output unit 27, reply packet generator 28, and reply packet transmitter 29. Receiving terminal 20A is not limited to have only the configurations of the respective units shown in FIG. 6. For example, packet counter updater 24A is constituted using the CPU, the MPU, or the DSP.

Based on the determination result related to the reception of the coded packets from packet normal reception determiner 23, packet counter updater 24A as an example of a counter updates counter value $P_{OK}$ indicating that the coded packets received by packet receiver 21 are normally received and counter value $P_{NG}$ indicating that packet receiver 21 is not able to normally receive the coded packets, and notifies D-transmission-interruption-signal transmission determiner 25 of the latest values of counter values $P_{OK}$ and $P_{NG}$.

Figure 7:
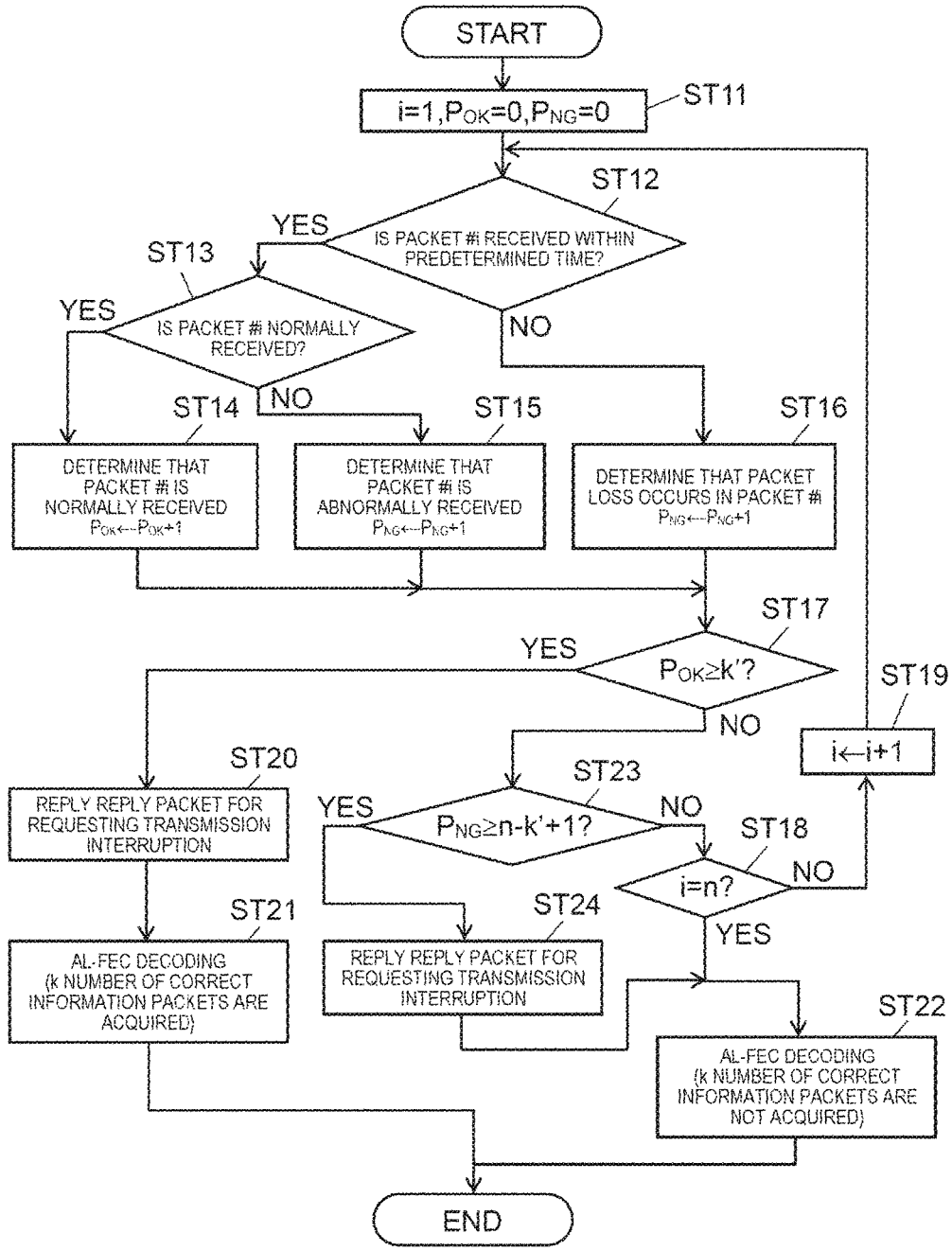
FIG. 7 is a flowchart for describing an example of an operation procedure of the receiving terminal according to the modification example of the first exemplary embodiment.

Hereinafter, an operation procedure of receiving terminal 20A according to the first modification example will be described with reference to FIG. 7. FIG. 7 is a flowchart for describing an example of the operation procedure of receiving terminal 20A according to the modification example of the first exemplary embodiment. The flowchart shown in FIG. 7 relates to a process of receiving 2,000,000 bits (200 packets) of coded packets for 100 ms once in a case where a transmission rate is 20 Mbps (in other words, transmitting terminal 10 transmits 2,000,000 bits of coded packets of the video data for 100 ms, for example) (see FIG. 1). In FIG. 7 the same processes as the respective processes shown in FIG. 5 will be assigned the same step numbers, and the description thereof will be omitted. Different contents will be described.

In FIG. 7, in a case where counter value $P_{OK}$ is not equal to or greater than k' (=105) (that is, is less than k') (ST17, NO), D-transmission-interruption-signal transmission determiner 25 determines whether or not counter value $P_{NG}$ is equal to or greater than (n−k'+1, for example, 96 (=200−105+1)) (ST23). In a case where it is determined that counter value $P_{NG}$ is equal to or greater than (n−k'+1) (ST23, YES), since the AL-FEC decoding is not able to be correctly performed even though the coded packets are transmitted to receiving terminal 20A in this point of time, D-transmission-interruption-signal transmission determiner 25 instructs reply packet generator 28 to transmit the reply packet for requesting the transmission interruption of the coded packets. In response to an instruction from D-transmission-interruption-signal transmission determiner 25, reply packet generator 28 generates the reply packet for requesting the transmission interruption of the coded packets, and sends the generated reply packet to reply packet transmitter 29. If the reply packet for requesting the transmission interruption of the coded packets is received from reply packet generator 28, reply packet transmitter 29 transmits the reply packet to transmitting terminal 10 (ST24).

After step ST24, D-transmission-interruption-signal transmission determiner 25 sends the AL-FEC decoding process start signal to AL-FEC decoder 26. In this case, since only the coded packets of less than k' are acquired, AL-FEC decoder 26 decodes k number of packets of the video data (ST22), and is not able to correctly decode the packets. Accordingly, the quality of the video data is deteriorated like a case where the video data in a section of 100 ms during which 200 coded packets are transmitted is distorted and output on receiving terminal 20A.

Accordingly, in communication system 50A according to the first modification example, in addition to the operation of receiving terminal 20 according to the first exemplary embodiment, receiving terminal 20A updates the number of normally received coded packets and the number of abnormally received coded packets by counting the normal and abnormal reception numbers in packet counter updater 24A, and similarly instructs reply packet transmitter 29 to transmit the reply packet for requesting the transmission interruption of the coded packets even in a case where the number of abnormally received coded packets reaches (n−k'+1). Accordingly, since receiving terminal 20A is able to decode the original packets of the video data by performing the AL-FEC decoding even though the coded packets are not transmitted from transmitting terminal 10 in a case where the number of normally received coded packets reaches k' and is not able to decode the original packets of the video data even though the coded packets are transmitted in a case where the number of abnormally received coded packets reaches (n−k'+1), the receiving terminal interrupts useless transmission of the coded packets in any case, and thus, it is possible to suppress the increase in the transmission amount of coded packets in the communication transmission path between transmitting terminal 10 and receiving terminal 20A.

Second Exemplary Embodiment

Next, in the case of multi-cast communication in which the coded packets are transmitted to a plurality of receiving terminals from one transmitting terminal in a simultaneous broadcasting manner, there is a high possibility that the number of coded packets capable of being normally received will be different between the respective receiving terminals depending on the positional relationships (for example, distances or presence or absence of an obstacle in the case of the wireless communication or a congestion state of communication paths in the case of the wired communication) between the transmitting terminal and the respective receiving terminals. In other words, the receiving terminals of which the reception states of the coded packets transmitted from the transmitting terminal are favorable and the receiving terminals of which the reception states are not favorable may be mixed in some arrangements of the transmitting terminal and the respective receiving terminals.

In order for the receiving terminal having a low normal reception rate to correctly decode the coded packets, a ratio (a so-called code rate (=k/n)) of the packets (k packets) of the video data to the coded packets (n packets) may be set to be low. However, if the code rate is set to be low in this manner, since n is increased, there is a problem that the transmission amount of coded packets is increased. Even though most receiving terminals demonstrate that $P_{OK} \geq k'$, since some receiving terminals of which the reception states are not favorable are present, there is a problem that the transmission amount of coded packets from the transmitting terminal is increased.

Thus, in the second exemplary embodiment, an example of the communication system which solves the above-described problems and is applied to the multi-cast communication in which the coded packets are transmitted to a plurality of receiving terminals from one transmitting terminal in a simultaneous broadcasting manner will be described. More specifically, in the communication system according to the present exemplary embodiment, the transmitting terminal dynamically sets the number A of remaining coded packets to be transmitted in a case where the number X of receiving terminals that transmit the reply packet for requesting the transmission interruption of the coded packets is equal to or greater than default value N' (<N) based on the fact that the number of normally received coded packets in each receiving terminal reaches k' in the multi-cast communication for N (for example, 80) number of receiving terminals. In a case where the number A of set coded packets to be transmitted is zero, transmitting terminal 10B causes packet transmitter 13 to interrupt the transmission of coded packets.

Figure 8:
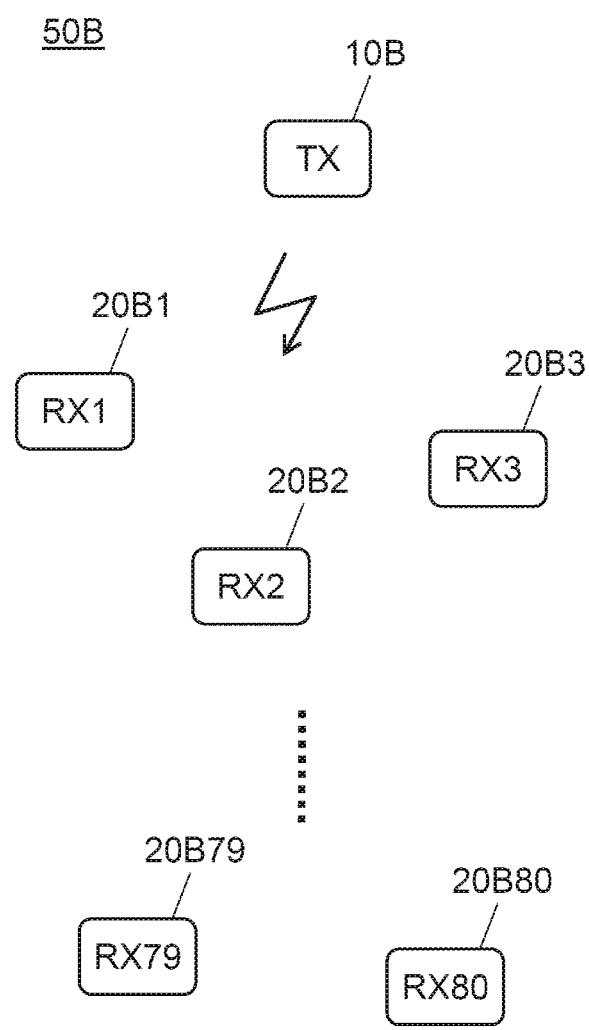
FIG. 8 is a schematic diagram showing an example of a state of the delivery of video data in a communication system according to a second exemplary embodiment.

FIG. 8 is a schematic diagram showing an example of a state of the delivery of the video data in communication system 50B according to the second exemplary embodiment. FIG. 9 is a diagram showing an example of the correspondence between receiving terminals 20B1 to 20B80 and the number of packets #i satisfying that counter value $P_{OK} \geq k'$. As shown in FIG. 8, communication system 50B according to the present exemplary embodiment is configured such that one transmitting terminal 10B and a plurality (for example, N=80) of receiving terminals 20B1 to 20B80 are connected via a network like a video delivery service within an airplane. Since an internal configuration of each of receiving terminals 20B1 to 20B80 is the same as the configuration of receiving terminal 20 described in the first exemplary embodiment, the description of the detailed operation of each receiving terminal will be omitted, and the details related to the operation of transmitting terminal 10B will be described (see FIG. 2).

In FIG. 9, receiving terminal 20B1 demonstrates that counter value $P_{OK} \geq k'$ when a 108th coded packet is received, receiving terminal 20B78 similarly demonstrates that counter value $P_{OK} \geq k'$ when a 145th coded packet is received, and receiving terminals 20B79 and 20B80 do not demonstrate that it is not satisfied that counter value $P_{OK} \geq k'$ even though a 200th (=n-th) coded packet is transmitted. In FIG. 9, since receiving terminal 20B3 demonstrates that counter value $P_{OK} \geq k'$ when a 105th coded packet is received, it can be seen that all the coded packets transmitted from transmitting terminal 10B are normally received.

Hereinafter, the details of communication system 50B according to the present exemplary embodiment will be described in detail.

Figure 10:
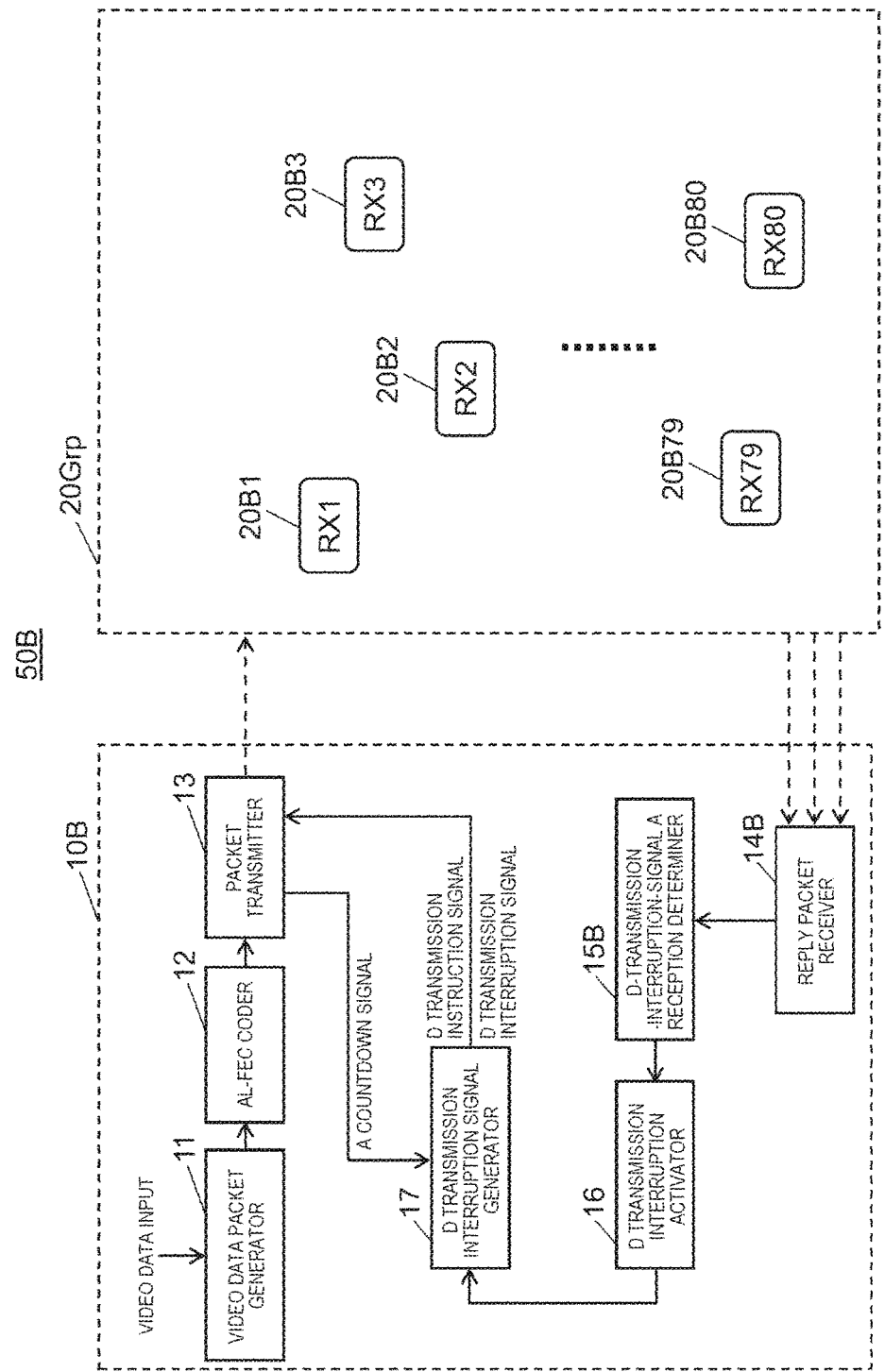
FIG. 10 is a block diagram showing an example of an internal configuration of the transmitting terminal of the communication system according to the second exemplary embodiment.

FIG. 10 is a block diagram showing an example of an internal configuration of the transmitting terminal of communication system 50B according to the second exemplary embodiment. Communication system 50B according to the present exemplary embodiment will be described in conjunction with the multi-cast communication between one transmitting terminal 10B and receiving terminal group 20Grp including a plurality (for example, 80) of receiving terminals 20B1 to 20B80.

Transmitting terminal 10B shown in FIG. 10 includes video data packet generator 11, AL-FEC coder 12, packet transmitter 13, reply packet receiver 14B, D-transmission-interruption-signal a reception determiner 15B, D transmission interruption activator 16, and D transmission interruption signal generator 17. Transmitting terminal 10B is not limited to have only the configurations of the respective units shown in FIG. 10. For example, video data packet generator 11, AL-FEC coder 12, D-transmission-interruption-signal a reception determiner 15B, D transmission interruption activator 16, and D transmission interruption signal generator 17 are constituted using the CPU, the MPU, or the DSP.

In a case where the reply packet transmitted from each of receiving terminals 20B1 to 20B80 is received, reply packet receiver 14B sends the reply packet to D-transmission-interruption-signal a reception determiner 15B.

D-transmission-interruption-signal a reception determiner 15B as an example of a transmission controller determines the transmission or the transmission interruption of the coded packets generated by AL-FEC coder 12 for receiving terminals 20B1 to 20B80. D-transmission-interruption-signal a reception determiner 15B counts the number of parameters X equivalent to the number of received reply packets for requesting the transmission interruption of the coded packets from the receiving terminal group 20Grp depending on the fact that the number of normally received coded packets reaches k', and determines to transmit only A number of coded packets later or interrupt the transmission of the coded packets after A number of coded packets are transmitted in a case where parameter X reaches default value N' (a value which is less than N and is, for example, 75). D-transmission-interruption-signal a reception determiner 15B sends an instruction to update and set parameter A indicating the transmission number to D transmission interruption activator 16.

D transmission interruption activator 16 as an example of a transmission number setter updates and sets parameter A indicating the number of coded packets to be transmitted as follows in response to an instruction from D-transmission-interruption-signal a reception determiner 15B. For example, D transmission interruption activator 16 selects a smaller value of a predetermined value (for example, a current value of parameter A) and a calculation value (for example, A=5(N−X)) in consideration of parameter X, as parameter A, and sets and updates the parameter. D transmission interruption activator 16 sends information related to parameter A to D transmission interruption signal generator 17.

In response to the information related to parameter A received from D transmission interruption activator 16, D transmission interruption signal generator 17 generates the D transmission instruction signal while parameter A is not zero, sends the generated D transmission instruction signal to packet transmitter 13, and transmits the coded packets. D transmission interruption signal generator 17 receives an A countdown signal for decreasing parameter A by one and updates parameter A whenever packet transmitter 13 transmits the coded packet. After parameter A becomes zero by receiving the A countdown signal a predetermined number of times, D transmission interruption signal generator 17 generates the D transmission interruption signal, sends the generated D transmission interruption signal to packet transmitter 13, and interrupts the transmission of the coded packets.

Figure 11:
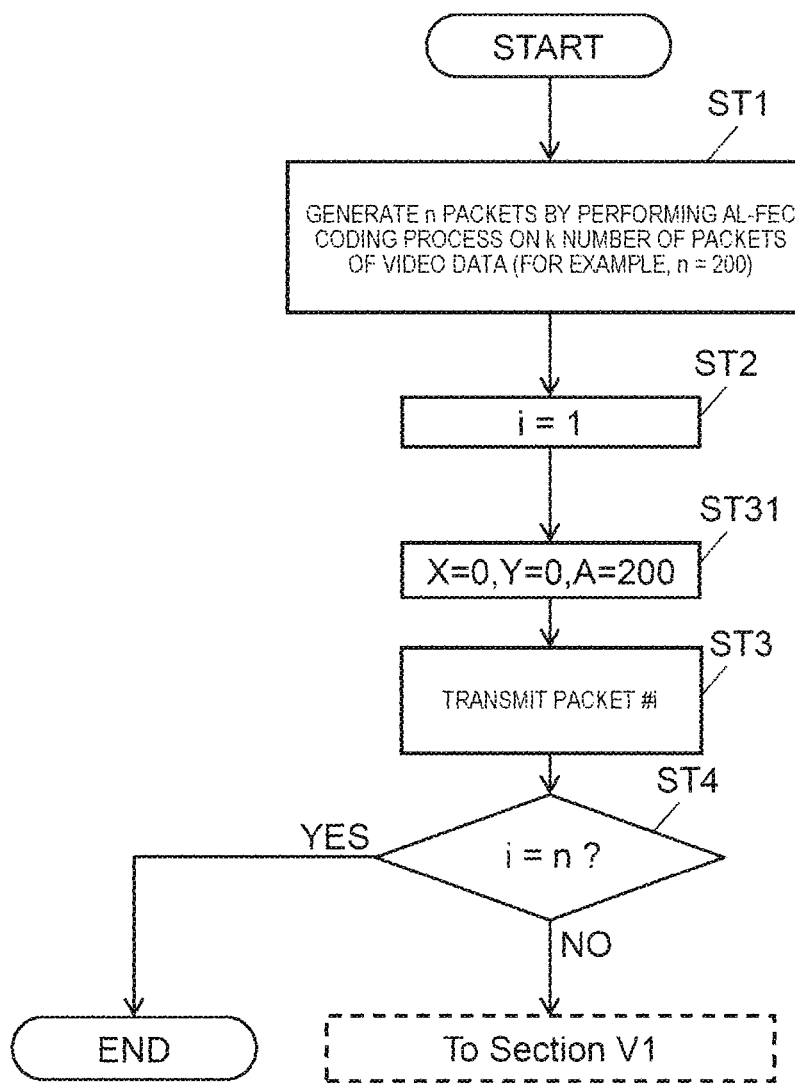
FIG. 11 is a flowchart for describing an example of an operation procedure of the transmitting terminal according to the second exemplary embodiment.
Figure 12:
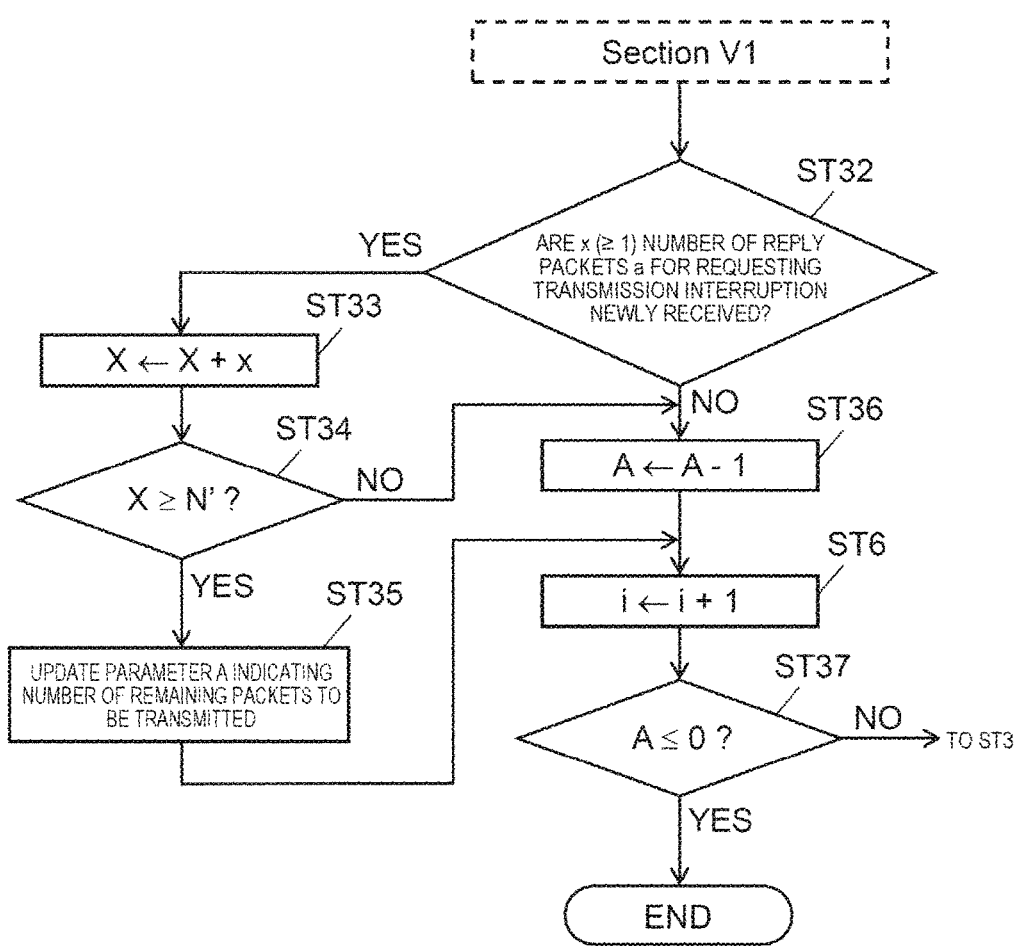
FIG. 12 is a flowchart for describing an example of the operation procedure of the transmitting terminal subsequently to FIG. 11.

Hereinafter, an operation procedure of transmitting terminal 10B according to the present exemplary embodiment will be described with reference to FIGS. 11 and 12. FIG. 11 is a flowchart for describing an example of the operation procedure of transmitting terminal 10B according to the second exemplary embodiment. FIG. 12 is a flowchart for describing an example of the operation procedure of transmitting terminal 10B subsequently to FIG. 11. The flowcharts shown in FIGS. 11 and 12 relate to a process of transmitting 2,000,000 bits (200 packets) of coded packets for 100 ms once in a case where a transmission rate is 20 Mbps (in other words, transmitting terminal 10 transmits 2,000,000 bits of coded packets of the video data for 100 ms, for example) (see FIG. 1). In FIGS. 11 and 12, the same processes as the processes shown in FIG. 5 will be assigned the same step numbers, and the description thereof will be simplified or omitted. Different contents will be described.

In FIG. 11, after step ST2, D-transmission-interruption-signal a reception determiner 15B initializes parameter X equivalent to the number of received reply packets for requesting the transmission interruption of the coded packets from receiving terminal group 20Grp depending on the fact that the number of normally received coded packets reaches k' and parameter Y equivalent to the number of received reply packets for requesting the transmission interruption of the coded packets from receiving terminal group 20Grp depending on the fact that the number of abnormally received coded packets reaches (n−k'+1) (ST31, X=Y=0). D-transmission-interruption-signal a reception determiner 15B sets parameter A indicating the number of coded packets to be transmitted to be 200, and sends information related to parameter A to D transmission interruption activator 16 (ST31). D transmission interruption activator 16 selects a smaller value of a current value (200) of parameter A and a calculation value (for example, A=5(N−X)) in consideration of parameter X, as parameter A, and sets and updates the parameter. Accordingly, D transmission interruption activator 16 sends information indicating that parameter A=200 to D transmission interruption signal generator 17. After step ST31, in response to the information related to parameter A received from D transmission interruption activator 16, D transmission interruption signal generator 17 generates the D transmission instruction signal, sends the generated D transmission instruction signal to packet transmitter 13, and transmits the coded packets (ST3).

In FIG. 12, in a case where it is not satisfied that parameter i=n (for example, 200) (ST4, NO), D-transmission-interruption-signal a reception determiner 15B determines whether or not x (≥1) number of reply packets a for requesting the transmission interruption are newly received from receiving terminal group 20Grp whenever packet transmitter 13 transmits one coded packet (packet #i) (ST32).

In a case where it is determined that x (≥1) number of reply packets a for requesting the transmission interruption are newly received from receiving terminal group 20Grp (ST32, YES), D-transmission-interruption-signal a reception determiner 15B updates parameter X equivalent to the number of received reply packets for requesting the transmission interruption of coded packets from receiving terminal group 20Grp depending on the fact that the number of normally received coded packets reaches k' to (X+x) (ST33). D-transmission-interruption-signal a reception determiner 15B determines whether or not the latest value of parameter X is equal to or greater than default value N' (which is less than N and is, for example, 75) (ST34).

In a case where it is determined that the latest value of parameter X is equal to or greater than default value N' (a value which is less than N and is, for example, 75) (ST34, YES), D-transmission-interruption-signal a reception determiner 15B determines to transmit only A number of coded packets later or interrupt the transmission of the coded packets after A number of coded packets are transmitted. D-transmission-interruption-signal a reception determiner 15B sends an instruction to update and set parameter A indicating the transmission number to D transmission interruption activator 16. D transmission interruption activator 16 updates and sets parameter A indicating the number of coded packets to be transmitted in response to an instruction from D-transmission-interruption-signal a reception determiner 15B (ST35).

Meanwhile, in a case where x number of reply packets a for requesting the transmission interruption are not newly received from receiving terminal group 20Grp whenever packet transmitter 13 transmits one coded packet (packet #i) (ST32, NO) or a case where the latest value of parameter X is less than default value N' (a value which is less than N and is, for example, 75) (ST34, NO), packet transmitter 13 generates the A countdown signal, and sends the generated A countdown signal to D transmission interruption signal generator 17. Accordingly, D transmission interruption signal generator 17 receives the A countdown signal of parameter A from packet transmitter 13, and updates parameter A by decreasing this parameter by one (ST36).

After step ST35 or step ST36, D transmission interruption signal generator 17 increments parameter i (ST6), generates the D transmission instruction signal for transmitting the coded packets, sends the generated D transmission instruction signal to packet transmitter 13, and transmits the coded packets. In a case where parameter A is zero (ST37, YES), D transmission interruption signal generator 17 generates the D transmission interruption signal, sends the generated D transmission interruption signal to packet transmitter 13, and interrupts the transmission of the coded packets. Meanwhile, in a case where parameter A is not zero (ST37, NO), the process of transmitting terminal 10B returns to step ST3.

Accordingly, in communication system 50B according to the present exemplary embodiment, transmitting terminal 10B dynamically sets parameter A indicating the number of remaining coded packets to be transmitted in a case where parameter X indicating the number of receiving terminals that transmit reply packets a for requesting the transmission interruption of the coded packets is equal to or greater than default value N' (<N (=80) and is, for example, 75) based on the fact that the number of normally received coded packets in receiving terminal group 20Grp reaches k' (for example, 105) in the multi-cast communication for N (for example, 80) number of receiving terminals 20B1 to 20B80. In a case where parameter A indicating the number of set coded packets to be transmitted is zero, transmitting terminal 10B causes packet transmitter 13 to interrupt the transmission of the coded packets.

Accordingly, communication system 50B can control the transmission amount of packets on which the AL-FEC coding is performed by the application requiring the real-time capabilities depending on the state of the communication transmission path of the multi-cast communication between one transmitting terminal 10B and the plurality of receiving terminals 20B1 to 20B80. In other words, since communication system 50B does not transmit k' (<n) number of coded packets to all the receiving terminals, and transmits only A number of remaining coded packets when the number X of receiving terminals that transmit the reply packets is equal to or greater than default value N' even though a probability that k' number of coded packets or more will be transmitted to all the receiving terminals from transmitting terminal 10B is decreased to some extent, it is possible to suppress the increase in the packet transmission amount in the communication transmission path between transmitting terminal 10B and each receiving terminal. That is, in a case where the number of reply packets (that is, X) for requesting the transmission interruption of the coded packets received from the receiving terminals is equal to or greater than default value N' before all n number of coded packets are transmitted, since transmitting terminal 10B interrupts the transmission of the coded packets without transmitting all n number of coded packets, it is possible to reduce the communication amount of coded packets to be transmitted, and it is possible to effectively use a wireless band.

In communication system 50B, transmitting terminal 10B selects a smaller value of a predetermined value (for example, a current value of transmission number A) and a calculation value corresponding to the number X of receiving terminals that transmit reply packets a for requesting the transmission interruption of the coded packets based on the fact that the number of normally received coded packets in receiving terminal group 20Grp reaches k' (for example, 105), as the number A of remaining coded packets to be transmitted. Accordingly, transmitting terminal 10B sets the transmission number of remaining coded packets A in consideration of the number X of receiving terminals of which the normal reception number reaches k' with which the AL-FEC decoding of the coded packets is able to be performed, and thus, it is possible to adaptively select the transmission amount of coded packets.

Modification Example of Second Exemplary Embodiment

In a modification example (hereinafter, referred to as a "second modification example") of the second exemplary embodiment, an example of communication system 50C in which reply packets b are transmitted to the transmitting terminal in a case where counter value $P_{OK}$ indicating that the receiving terminal of the receiving terminal group normally receives the coded packets reaches a predetermined value (for example, k') and also n a case where counter value $P_{NG}$ indicating that the receiving terminal of the receiving terminal group is not able to normally receive the coded packets reaches a predetermined value (for example, n−k'+1) will be described.

In the following description, the reply packet transmitted from the receiving terminal based on the fact that counter value $P_{OK}$ indicating that the receiving terminal normally receives the coded packets reaches a predetermined value (for example, k') is described as "reply packet a", and the reply packet transmitted from the receiving terminal based on the fact that counter value $P_{NG}$ indicating that the receiving terminal is not able to normally receive the coded packets reaches a predetermined value (for example, (n−k'+1)) is described as "reply packet b".

Figure 13:
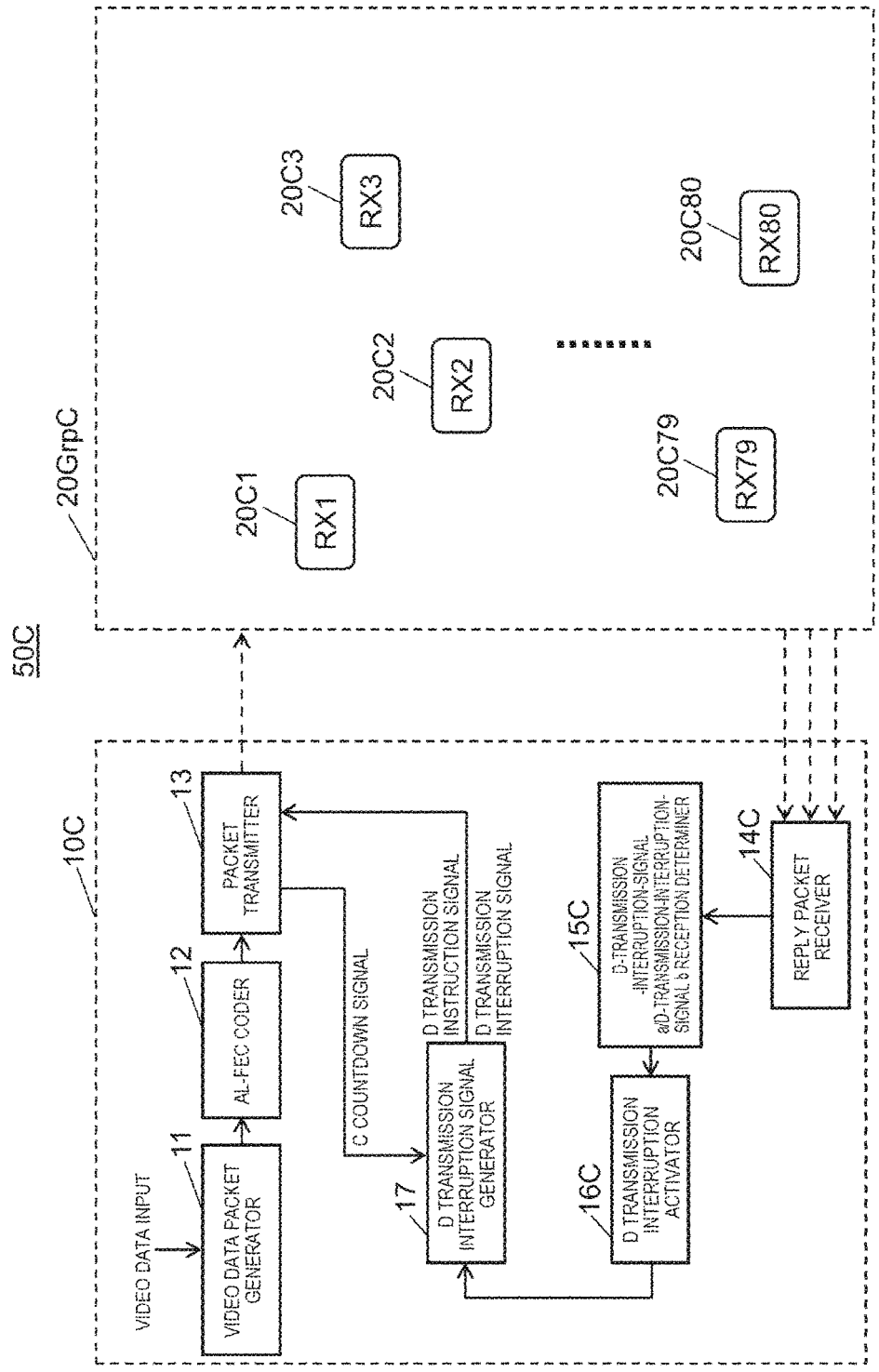
FIG. 13 is a block diagram showing an example of an internal configuration of a transmitting terminal of a communication system according to a modification example of the second exemplary embodiment.

FIG. 13 is a block diagram showing an example of an internal configuration of transmitting terminal 10C of communication system 50C according to the modification example of the second exemplary embodiment. Among the respective units of transmitting terminal 10C and receiving terminal group 20GrpC (that is, receiving terminals 20C1 to 20C80) shown in FIG. 13, the units having the same configurations and operations as those of the respective units of transmitting terminal 10B shown in FIG. 10 and receiving terminal 20A shown in FIG. 6 will be assigned the same reference marks, and the description thereof will be omitted. Different contents will be described.

Transmitting terminal 10C shown in FIG. 13 includes video data packet generator 11, AL-FEC coder 12, packet transmitter 13, reply packet receiver 14C, D-transmission-interruption-signal a/D-transmission-interruption-signal b reception determiner 15C, D transmission interruption activator 16C, and D transmission interruption signal generator 17. Transmitting terminal 10C is not limited to have only the configurations of the respective units shown in FIG. 13. For example, video data packet generator 11, AL-FEC coder 12, D-transmission-interruption-signal a/D-transmission-interruption-signal b reception determiner 15C, D transmission interruption activator 16C, and D transmission interruption signal generator 17 are constituted using the CPU, the MPU, or the DSP.

In a case where reply packets a and reply packets b transmitted from receiving terminals 20C1 to 20C80 are received, reply packet receiver 14C sends reply packets a or reply packets b to D-transmission-interruption-signal a/D-transmission-interruption-signal b reception determiner 15C.

D-transmission-interruption-signal a/D-transmission-interruption-signal b reception determiner 15C as an example of a transmission controller determines the transmission or the transmission interruption of the coded packets generated by AL-FEC coder 12 for receiving terminals 20C1 to 20C80. D-transmission-interruption-signal a/D-transmission-interruption-signal b reception determiner 15C counts parameter X equivalent to the number of received reply packets a and parameter Y equivalent to the number of received reply packets b, and determines to transmit only C number of coded packets later and interrupt the transmission of the coded packets after C number of coded packets are transmitted in a case where the sum (X+Y) of parameter X and parameter Y reaches default value N' (a value which is less than N and is, for example, 75). D-transmission-interruption-signal a/D-transmission-interruption-signal b reception determiner 15C sends an instruction to update and set parameter C indicating the transmission number to D transmission interruption activator 16C.

D transmission interruption activator 16C as an example of a transmission number setter updates and sets parameter C indicating the number of coded packets to be transmitted as follows in response to an instruction from D-transmission-interruption-signal a/D-transmission-interruption-signal b reception determiner 15C. For example, D transmission interruption activator 16C selects a smaller value of a predetermined value (for example, a current value of parameter C) or a calculation value (for example, C=6(N−X−Y)) in consideration of parameters X and Y, and sets and updates the parameter. D transmission interruption activator 16C sends information related to parameter C to D transmission interruption signal generator 17.

FIG. 14 is a diagram showing an example of the correspondence between receiving terminals 20C1 to 20C80 and the number of packets #i satisfying that counter value $P_{OK} \geq k'$ and the number of packets #i satisfying that counter value $P_{NG} \geq n-k'+1$. In FIG. 14, receiving terminal 20C1 demonstrates that counter value $P_{OK} \geq k'$ when a 110th coded packet is received, and receiving terminal 20C75 similarly demonstrates that counter value $P_{OK} \geq k'$ when a 180th coded packet is received.

In FIG. 14, receiving terminal 20076 demonstrates that counter value $P_{NG} \geq (n-k'+1)$ when a 175th coded packet is received and receiving terminal 20C80 demonstrates that counter value $P_{NG} \geq (n-k'+1)$ when a 110th coded packet is received. In FIG. 14, since receiving terminal 20C79 demonstrates that counter value $P_{NG} \geq (n-k'+1)$ when a 96th coded packet is received, it can be seen that all the coded packets transmitted from transmitting terminal 10C are not normally received.

Figure 15:
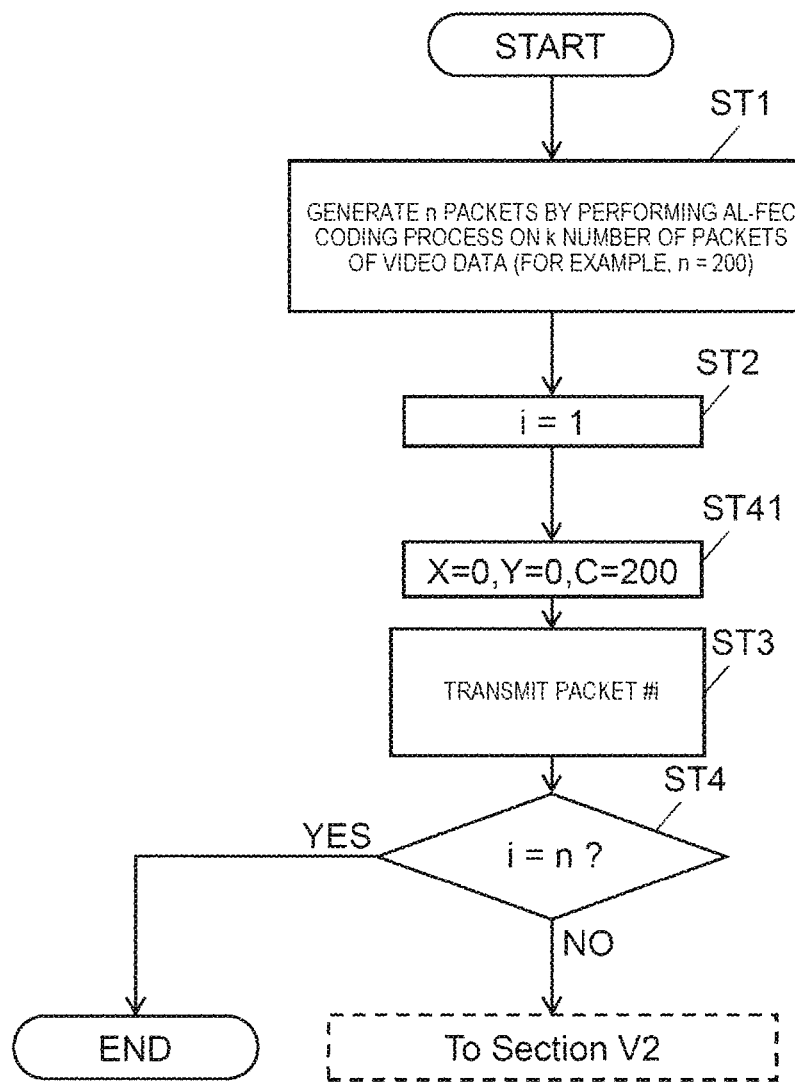
FIG. 15 is a flowchart for describing an example of the operation procedure of the transmitting terminal according to the modification example of the second exemplary embodiment.
Figure 16:
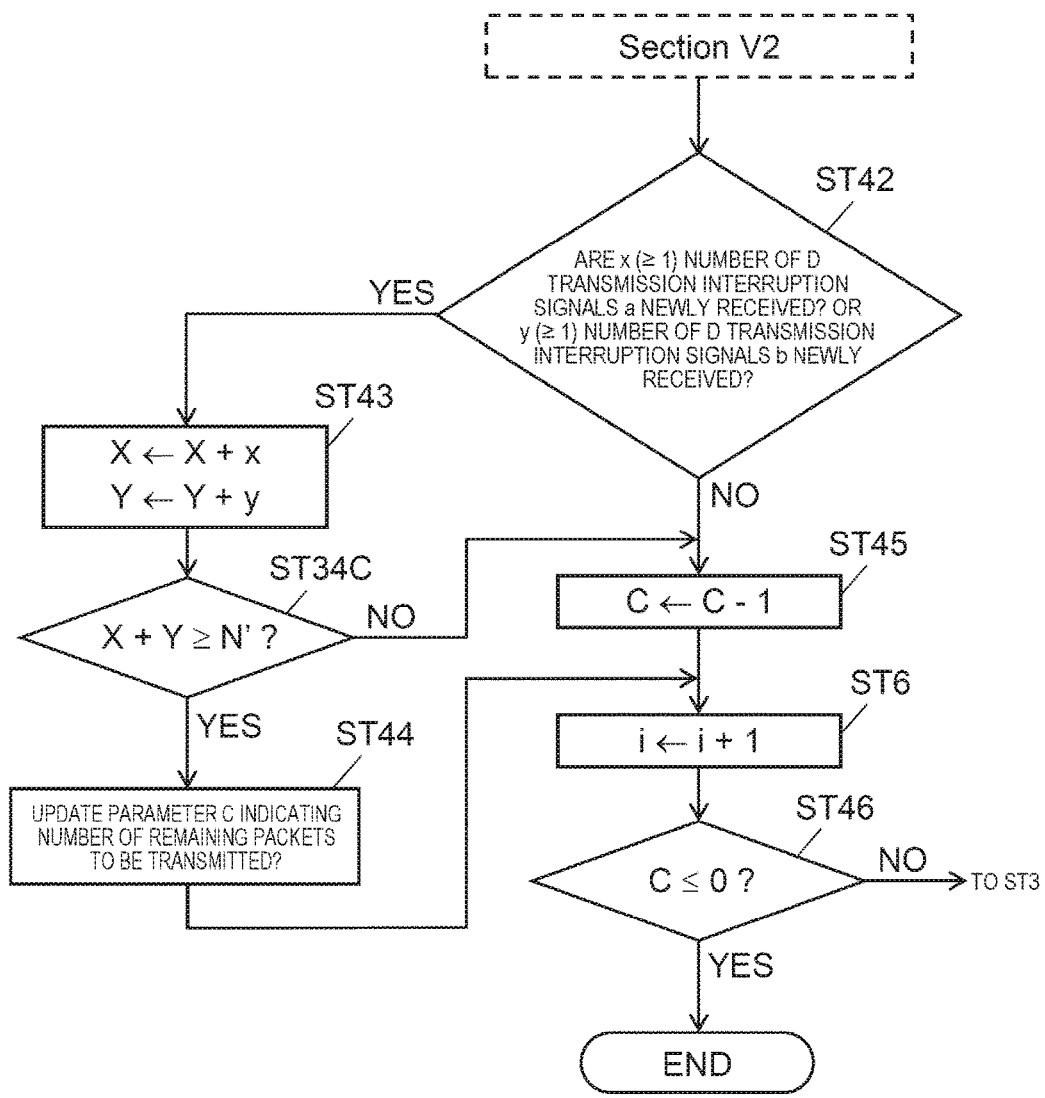
FIG. 16 is a flowchart for describing an example of an operation procedure of the transmitting terminal subsequently to FIG. 15.

An operation procedure of transmitting terminal 10C according to the second modification example will be described with reference to FIGS. 15 and 16. FIG. 15 is a flowchart for describing an example of the operation procedure of transmitting terminal 10C according to the modification example of the second exemplary embodiment. FIG. 16 is a flowchart for describing an example of the operation procedure of transmitting terminal 10C subsequently to FIG. 15. The flowcharts shown in FIGS. 15 and 16 relate to a process of transmitting 2,000,000 bits (200 packets) of coded packets for 100 ms once in a case where a transmission rate is 20 Mbps (in other words, transmitting terminal 10 transmits 2,000,000 bits of coded packets of the video data for 100 ms, for example) (see FIG. 1). In FIGS. 15 and 16, the same processes as the respective processes shown in FIGS. 11 and 12 will be assigned the same step numbers, and the description thereof will be simplified and omitted. Different content will be described.

In FIG. 15, after step ST2, D-transmission-interruption-signal a/D-transmission-interruption-signal b reception determiner 15C initializes parameter X equivalent to the number of received reply packets a and parameter Y equivalent to the number of received reply packets b (ST41, X=Y=0). D-transmission-interruption-signal a/D-transmission-interruption-signal b reception determiner 15C sets parameter C indicating the number of coded packets to be transmitted to be 200, and sends information related to parameter C to D transmission interruption activator 16C (ST41). D transmission interruption activator 16C selects a smaller value of a current value (200) of parameter C and a calculation value (for example, C=6(N−X−Y)) in consideration of parameters X and Y, as parameter C, and sets and updates the parameter. Accordingly, D transmission interruption activator 16C sends information indicating that parameter C=200 to D transmission interruption signal generator 17. After step ST31, in response to the information related to parameter C received from D transmission interruption activator 16C, D transmission interruption signal generator 17 generates the D transmission instruction signal, sends the generated D transmission instruction signal to packet transmitter 13, and transmits the coded packets (ST3).

In FIG. 16, in a case where it is not satisfied that parameter i=n (for example 200) (ST4, NO), D-transmission-interruption-signal a/D-transmission-interruption-signal b reception determiner 15C determines whether or not x (≥1) number of reply packets a for requesting the transmission interruption are newly received from receiving terminal group 20GrpC or whether or not y (≥1) number of reply packets b for requesting the transmission interruption are newly received from receiving terminal group 20GrpC whenever packet transmitter 13 transmits one coded packet (packet #i) (ST42).

In a case where it is determined that x (≥1) number of reply packets a are newly received or y (≥1) number of reply packets b are newly received from receiving terminal group 20GrpC (ST42, YES), D-transmission-interruption-signal a/D-transmission-interruption-signal b reception determiner 15C updates parameter X equivalent to the number of received reply packets a to (X+x) or updates parameter Y equivalent to the number of received reply packets b to (Y+y) (ST43). D-transmission-interruption-signal a/D-transmission-interruption-signal b reception determiner 15C determines whether or not the latest value of the sum (X+Y) of parameters X and Y is equal to or greater than default value N' (a value which is less than N and is, for example, 75) (ST34C).

In a case where it is determined that the latest value of the sum (X+Y) of parameters X and Y is equal to or greater than default value N' (a value which is less than N and is, for example, 75) (ST34C, YES), D-transmission-interruption-signal a/D-transmission-interruption-signal b reception determiner 15C determines to transmit only C number of coded packets later and interrupt the transmission of the coded packets after C number of coded packets are transmitted. D-transmission-interruption-signal a/D-transmission-interruption-signal b reception determiner 15C sends an instruction to update and set parameter C indicating the transmission number to D transmission interruption activator 16C. In response to an instruction from D-transmission-interruption-signal a/D-transmission-interruption-signal b reception determiner 15C, D transmission interruption activator 16C updates and sets parameter C indicating the number of coded packets to be transmitted (ST44).

Meanwhile, in a case where x (≥1) number of reply packets a are not newly received and y (≥1) number of reply packets b are not newly received from receiving terminal group 20GrpC whenever packet transmitter 13 transmits one coded packet (packet #i) (ST42, NO) or in a case where the latest value of the sum (X+Y) of parameters X and Y is less than default value N' (a value which is less than N and is, for example, 75) (ST34C, NO), packet transmitter 13 generates a C countdown signal, and sends the C countdown signal to D transmission interruption signal generator 17. Accordingly, D transmission interruption signal generator 17 receives the C countdown signal of parameter C from packet transmitter 13, and updates parameter C by decreasing this parameter by one (ST45).

After step ST44 or step ST35, D transmission interruption signal generator 17 increments parameter i (ST6), generates the D transmission instruction signal for transmitting the coded packets, sends the generated D transmission instruction signal to packet transmitter 13, and transmits the coded packets. In a case where parameter C is zero (ST46, YES), D transmission interruption signal generator 17 generates the D transmission interruption signal, sends the generated D transmission interruption signal to packet transmitter 13, and interrupts the transmission of the coded packets. Meanwhile, in a case where parameter C is not zero (ST46, NO), the process of transmitting terminal 10C returns to step ST3.

As described above, in communication system 50C according to the second modification example, transmitting terminal 10C dynamically sets parameter C indicating the number of remaining coded packets to be transmitted in a case where the sum (X+Y) of the number X of receiving terminals that transmit reply packets a for requesting the transmission interruption of the coded packets based on the fact that the number of normally received coded packets reaches k' and the number Y of receiving terminals that transmit reply packets b for requesting the transmission interruption of the coded packets based on the fact that the number of abnormally received coded packets reaches (n−k'+1) is equal to or greater than default value N' (<N) in the multi-cast communication for N (for example, 80) number of receiving terminals 20C1 to 20C80. In a case where parameter C indicating the number of set coded packets to be transmitted is zero, transmitting terminal 10C causes packet transmitter 13 to interrupt the transmission of the coded packets.

Accordingly, communication system 50C can control the transmission amount of packets on which the AL-FEC coding is performed by the application requiring the real-time capabilities depending on the state of the communication transmission path of the multi-cast communication between one transmitting terminal 10C and the plurality of receiving terminal 20C1 to 20C80. In other words, since communication system 50C does not transmit k' number of coded packets to all the receiving terminals, and transmits only C number of remaining coded packets when the sum (X+Y) of the number X of receiving terminals that transmit reply packets a since the AL-FEC decoding is able to be sufficiently performed even though more coded packets are transmitted and the number Y of receiving terminals that transmit reply packets b since the AL-FEC decoding is not able to be performed even though more coded packets are transmitted is equal to or greater than default value N' even if a probability that k' number of coded packets or more will be transmitted to all the receiving terminals from transmitting terminal 10C is decreased to some extent, it is possible to suppress the increase in the packet transmission amount in the communication transmission path between transmitting terminal 10C and receiving terminal 20C1 to 20C80. That is, in a case where the sum (that is, X+Y) of the number of received reply packets a and the number of received reply packets b for requesting the transmission interruption of the coded packets from the receiving terminals is equal to or greater than default value N' before all n number of coded packets are transmitted, since transmitting terminal 10C interrupts the transmission of the coded packets without transmitting all n number of coded packets, it is possible to reduce the communication amount of coded packets to be transmitted, and it is possible to effectively use the wireless band.

In communication system 50C, transmitting terminal 10C selects a smaller value of a predetermined value (for example, a current value of transmission number C) and a calculation value corresponding to parameters X and Y indicating the number of receiving terminals that transmit reply packets a and reply packets b for requesting the transmission interruption of the coded packets, as parameter C indicating the number of remaining coded packets to be transmitted. Accordingly, since transmitting terminal 10C sets the number C of remaining coded packets to be transmitted in consideration of the number X of receiving terminals of which the normal reception number reaches k' with which the AL-FEC decoding of the coded packets is able to be performed and abnormal reception number (n−k'+1) with which the AL-FEC decoding of the coded packets is not able to be performed, it is possible to adaptively select the transmission amount of coded packets.

Although various exemplary embodiments have been described with reference to the drawings, the present disclosure is not limited to these embodiments. It is to be appreciated that those skilled in the art can variously change or modify the embodiments without departing from the scope described in claims, and it is understood that such changes or modifications would fall within the scope of the present disclosure.

In the first exemplary embodiment or the first modification example, counter value $P_{OK}$ indicating that receiving terminal 20 normally receives the coded packets or counter value $P_{NG}$ indicating that the receiving terminal is not able to normally receive the coded packets are counted and counter value $P_{OK}$ reaches a predetermined value (for example, k'=105), and thus, the reply packets for requesting the transmission interruption of the coded packets are transmitted to transmitting terminal 10. Here, transmitting terminal 10 does not necessarily interrupt the transmission of the coded packets only in a case where receiving terminal 20 transmits the reply packet. For example, the receiving terminal may transmit a response indicating whether or not the coded packet is normally received to transmitting terminal 10 whenever receiving terminal 20 normally receives or is not able to normally receive the coded packets, and transmitting terminal 10 may interrupt the transmission of the coded packets in a case where counter value $P_{OK}$ reaches a predetermined value (for example, k'=105) (see the second exemplary embodiment).

Although it has been described in the second exemplary embodiment or the second modification example that it is assumed that transmitting terminal 10C knows the number (equivalent to parameter N) (for example, 80) of receiving terminals in the multi-cast communication, transmitting terminal 10C may know the number of receiving terminals in a case where the transmitting terminal does not know the number of receiving terminals of the receiving terminal group. For example, transmitting terminal 10 or transmitting terminal 10C transmits all n (=200) number of coded packets. In this case, reply packets a or reply packets b are transmitted to transmitting terminal 10 or transmitting terminal 10C from the receiving terminals of receiving terminal group 20Grp or receiving terminal group 20GrpC. Accordingly, transmitting terminal 10 or transmitting terminal 10C can recognize parameter N indicating the number of receiving terminals of receiving terminal group 20Grp or receiving terminal group 20GrpC by setting the sum (X+Y) of parameters X and Y=N. Here, since there is a possibility that parameter N indicating the number of receiving terminals of receiving terminal group 20Grp or receiving terminal group 20GrpC will vary with time, it is preferable that transmitting terminal 10 or transmitting terminal 10C acquires the latest value of N by regularly transmitting all n number of coded packets.

In the second exemplary embodiment or the second modification example, in a case where reply packets a or reply packets b are not received within a predetermined time after the coded packets are transmitted, transmitting terminal 10C may interrupt the transmission of the coded packets.

Figure 17:
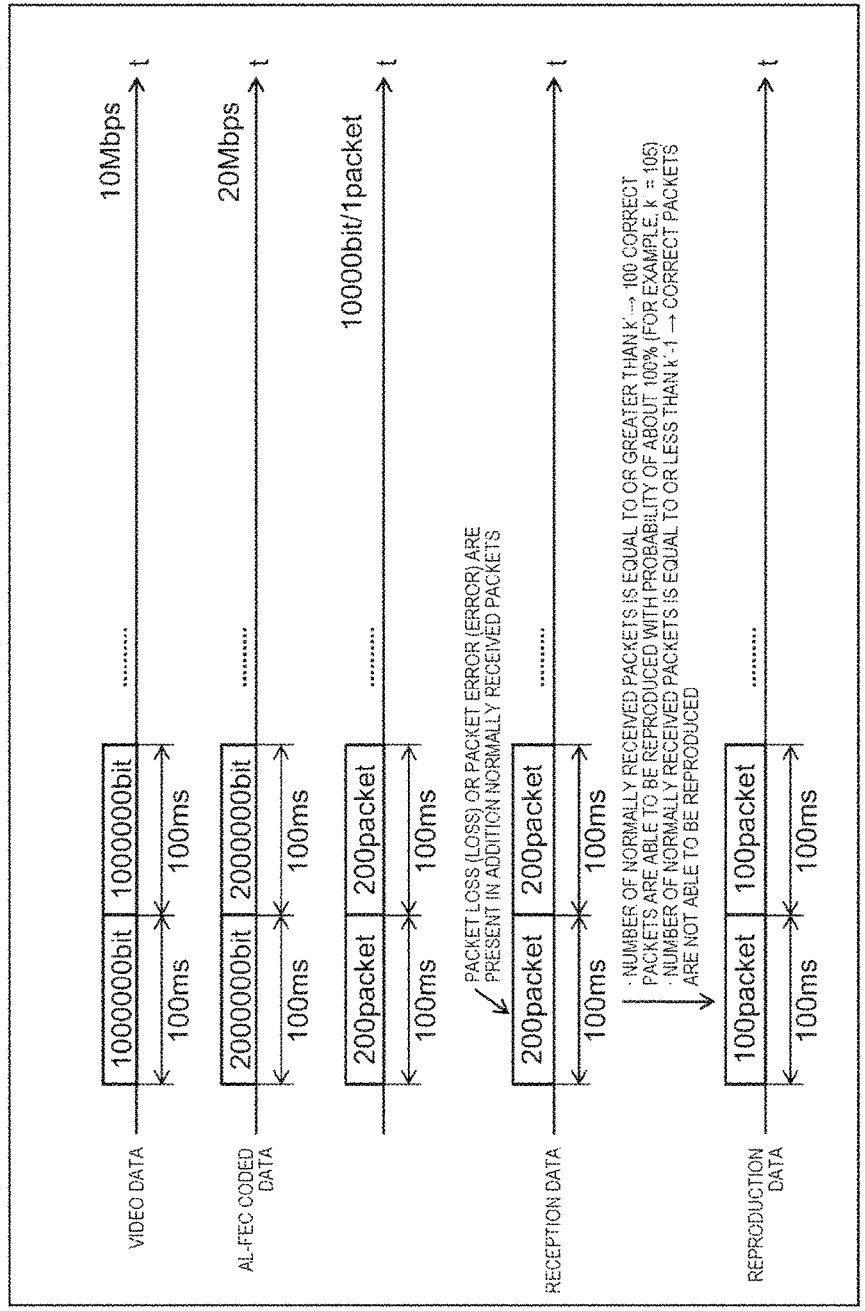
FIG. 17 is an explanatory diagram of problems of the related art in a case where AL-FEC is performed on video data and the video data is transmitted.

Before the exemplary embodiments in which the communication system, the transmitting device, and the receiving device according to the present disclosure are specifically disclosed, a background of the contents of the exemplary embodiments will be described with reference to FIG. 17. FIG. 17 is an explanatory diagram of problems of the related art in a case where AL-FEC is performed on the video data and the video data is transmitted. In the following description, AL-FEC means that an FEC process is performed as an example of error correction coding at an application layer (Layer 7).

Initially, a transmitting side performs coding (for example, forward error correction (FEC)) on k packets of video data as an example of coding of data (for example, video data (the same applies in later occurrences)) as a transmission target at the application layer, generates n (n=k+m) (all n, k, and m are integers of 1 or more) number of coded packets, and transmits the generated coded packets. The receiving side is able to correctly decode the original video data in a case where k' (k' is a value which is equal to k or is slightly greater than k) number of arbitrary packets out of n packets are normally received (that is, in a case where there is no packet loss or reception error). In other words, the receiving side is not able to correctly decode the original video data in a case where (n−k'+1) number of packets out of n packets are abnormally received (that is, in a case where there is no packet loss or reception error). For example, raptor codes are known as codes used in the error correction coding process. Hereinafter, the raptor codes are used as the example of the error correction codes of the data at the application layer for the sake of convenience in the description, but the error correction codes are not limited to the raptor codes.

A time chart related to the transmission of the video data from the transmitting side is illustrated in a topmost row of FIG. 17, time charts related to the transmission of the packets (coded packets) and the data (hereinafter, referred to as "AL-FEC coded data") on which the error correction coding is performed at the application layer are respectively illustrated in second and third rows from the top, a time chart related to the reception of the reception data (coded packets) on the receiving side is illustrated in a second row from the bottom, and a time chart related to the reproduction of the video data (reproduction data) acquired by decoding the AL-FEC coded data on the receiving side is illustrated in a bottommost row.

Hereinafter, an example in which wireless communication is used as a communication form between the transmitting side and the receiving side will be described, and it is assumed that k=100, m=100, n=200, and k'=105 for the sake of convenience in the description. That is, since a state of a communication transmission path in the wireless communication varies with time, it is necessary to set a value of k to be larger than a value of n in order to perform communication of high-quality video data.

In FIG. 17, since a transmission rate of the video data is 10 Mbps (that is, 1,000,000 bits are transmitted for 100 ms) and a transmission rate of the AL-FEC coded data is 20 Mbps, 200 packets (that is, packets (hereinafter, referred to as "coded packets") including the AL-FEC code data) for 100 ms are transmitted from the transmitting side. The receiving side receives the 200 coded packets for 100 ms, but the 200 coded packets include the coded packets in which a packet loss (LOSS) or a packet error (ERROR) occurs in addition to the coded packets which are normally received.

In a case where the transmitting side uses the raptor codes in the error correction coding at the application layer, if the number of coded packets which are normally received is equal to or greater than k', since the receiving side is able to correctly decode coded packets with a probability of almost about 100%, the receiving side is able to correctly reproduce video data corresponding to 100 packets. Meanwhile, if the number of coded packets which are normally received is equal to or less than (k'−1) (that is, the number of coded packets which are abnormally received is equal to or greater than (n−k'+1)), the receiving side is not able to correctly decode the coded packets, the receiving side is not able to correctly reproduce the video data corresponding to 100 packets. That is, the quality of video is deteriorated like a case where the video is distorted and reproduced.

Accordingly, in a case where the state of the communication transmission path between the transmitting side and the receiving side is poor and the normal reception rate of the coded packets is considerably less than k'/n, if a probability that k' number of coded packets will be received is low and the next 200 coded packets are transmitted after all n (for example, 200) number of coded packets are transmitted from the transmitting side, the transmission amount of coded packets from the transmitting side is excessively increased. That is, there is a problem that such a case is not efficient since the transmission amount of coded packets in the communication transmission path is uselessly increased.

Thus, in the following exemplary embodiments, examples of the communication system, the transmitting device, and the receiving device which suppress an increase in a packet transmission amount in a communication transmission path by controlling the transmission amount of packets on which error correction coding is performed by an application requiring real-time capabilities depending on a state of the communication transmission path between the transmitting device and the receiving device will be described.

Third Exemplary Embodiment

In a third exemplary embodiment, an example of the communication system applied to unicast communication in which the coded packets of the data are transmitted to one receiving terminal from one transmitting terminal will be described. More specifically, in the communication system according to the present exemplary embodiment, the transmitting terminal generates n (for example, 200) number of coded packets by coding (AL-FEC coding) k (for example, 100) number of packets (data packets) of the video data as the transmission target and transmits sequentially the coded packets to the receiving terminal in response to a transmission instruction of the coded packets in the application requiring the real-time capabilities. The receiving terminal receives the coded packets transmitted from the transmitting terminal, and transmits a reply packet for requesting a transmission interruption of the coded packets to the transmitting terminal in a case where a first condition (see the details to be described below) in which the coded packets are able to be decoded is satisfied. In a case where the reply packet is received, the transmitting terminal determines the transmission interruption of the coded packets, and interrupts the transmission of the coded packets.

Hereinafter, the details of communication system 50 according to the present exemplary embodiment will be described in detail.

Figure 18:
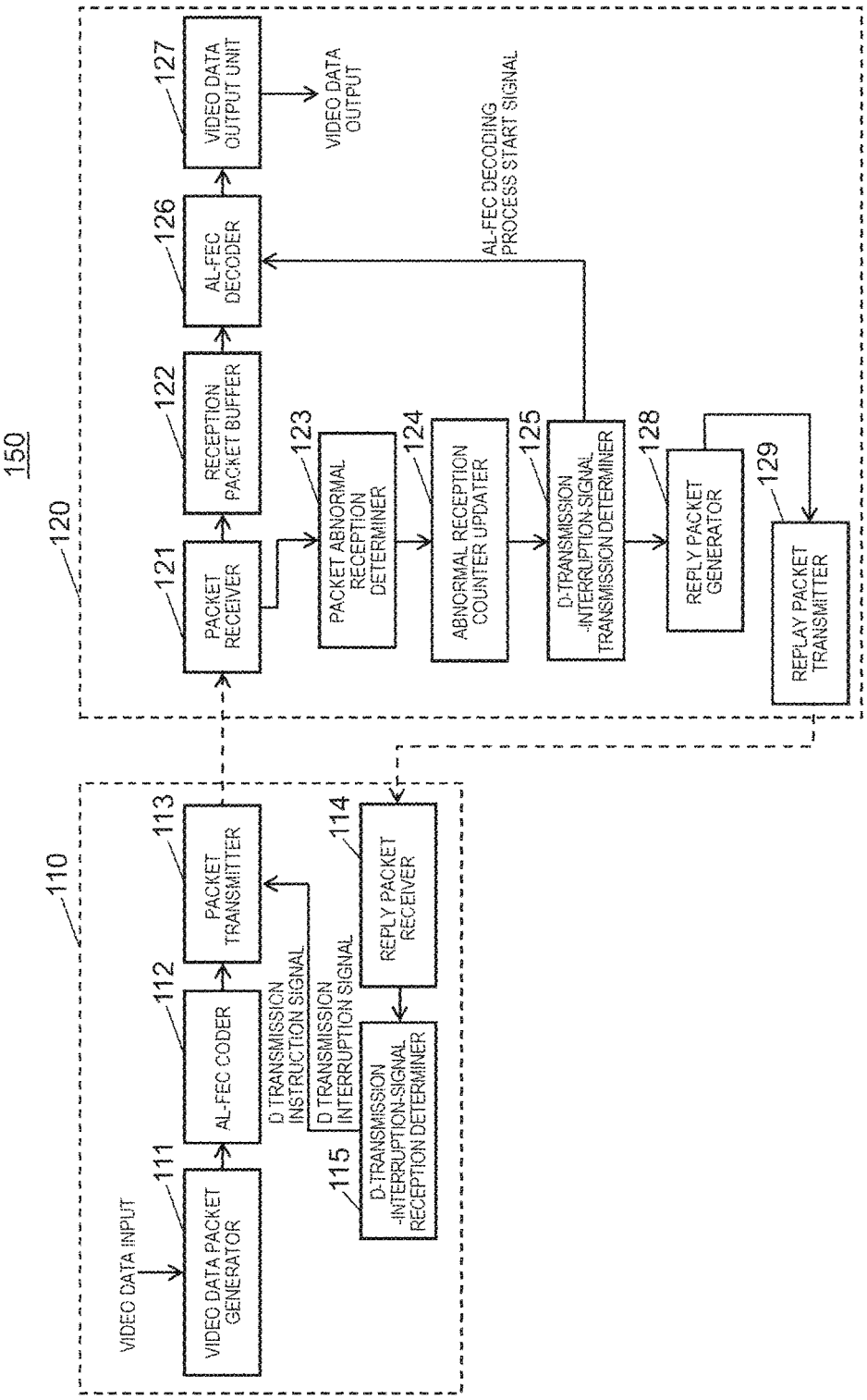
FIG. 18 is a block diagram showing an example of an internal configuration of a transmitting terminal and a receiving terminal of a communication system according to a third exemplary embodiment.

FIG. 18 is a block diagram showing an example of an internal configuration of transmitting terminal 110 and receiving terminal 120 of communication system 150 according to the third exemplary embodiment. In communication system 150 according to the present exemplary embodiment, an example in which unicast communication between one transmitting terminal 110 and one receiving terminal 120 is used will be described. Transmitting terminal 110 and receiving terminal 120 are communication devices connected to a network, and are, for example, personal computers (PCs), mobile phones, smartphones, and tablet terminals. The same is true of the following exemplary embodiments. The network may be a network (for example, Long Term Evolution (LTE), 3G, High Speed Packet Access (HSPA), Wi-Fi (registered trademark), or Bluetooth (registered trademark) using wireless communication, or a network (for example, Ethernet (registered trademark)) using wired communication. The same is true of the following exemplary embodiments.

Transmitting terminal 110 shown in FIG. 18 includes video data packet generator 111, AL-FEC coder 112, packet transmitter 113, reply packet receiver 114, and D-transmission-interruption-signal reception determiner 115. Transmitting terminal 110 is not limited to have only the configurations of the respective units shown in FIG. 18. Video data packet generator 111, AL-FEC coder 112, and D-transmission-interruption-signal reception determiner 115 are constituted using a central processing unit (CPU), a micro processing unit (MPU), or a digital signal processor (DSP).

Video data packet generator 111 as an example of a packet generator receives data (for example, video data) as the transmission target from a video codec (not shown), generates k number of packets (video data packets) of the video data, and sends the generated packets to AL-FEC coder 112. Hereinafter, an example in which k is 100 will be described.

AL-FEC coder 112 as an example of a coder generates n (>k) number of coded packets by performing the error correction coding on k number of video data packet received from video data packet generator 111 by using the raptor codes at the application layer, and sends the generated packets to packet transmitter 113. Thus, if receiving terminal 120 is able to normally receive k' (<n) (which is slightly greater than k) number of coded packets before n number of coded packets are received, the receiving terminal is able to decode the k number of packets of the video data from k' number of coded packets. Meanwhile, in a case where (n−k'+1) (k<k'<n) number of coded packets are not able to be normally received before n number of coded packets are received, receiving terminal 120 is not able to decode k number of packets of the video data. Hereinafter, an example in which n is 200 will be described. In other words, the above-described first condition means that 96 (=(n−k'+1)) number of coded packets out of 200 (=n) coded packets are not able to be normally received by receiving terminal 120 before 200 coded packets generated by transmitting terminal 110 are transmitted.

Packet transmitter 113 as an example of a first transmitter sequentially transmits the coded packets received from AL-FEC coder 112 while receiving a D (data) transmission instruction signal from D-transmission-interruption-signal reception determiner 115. Meanwhile, packet transmitter 113 interrupts the transmission of the coded packets received from AL-FEC coder 112 when the D transmission interruption signal of the coded packets is received from D-transmission-interruption-signal reception determiner 115.

In a case where the reply packet (see below) transmitted from receiving terminal 120 is received, reply packet receiver 114 sends the reply packet to D-transmission-interruption-signal reception determiner 115. D-transmission-interruption-signal reception determiner 115 as an example of a transmission controller instructs packet transmitter 113 to perform the transmission or the transmission interruption of the coded packets generated by AL-FEC coder 112 for receiving terminal 120. In a case where the reply packet for requesting the transmission interruption of the coded packets from receiving terminal 120 is received from reply packet receiver 114, D-transmission-interruption-signal reception determiner 115 generates the D transmission interruption signal, sends the generated D transmission interruption signal to packet transmitter 113, and interrupts the transmission of the coded packets. Meanwhile, in a case where the reply packet for requesting the transmission interruption of the coded packets from receiving terminal 120 is not received from reply packet receiver 114, D-transmission-interruption-signal reception determiner 115 generates the D transmission instruction signal for transmitting the coded packets, sends the generated D transmission instruction signal to packet transmitter 113, and transmits the coded packets.

Receiving terminal 120 shown in FIG. 18 includes packet receiver 121, reception packet buffer 122, packet abnormal reception determiner 123, abnormal reception counter updater 124, D-transmission-interruption-signal transmission determiner 125, AL-FEC decoder 126, video data output unit 127, reply packet generator 128, and reply packet transmitter 129. Receiving terminal 120 is not limited to have only the configurations of the respective units shown in FIG. 18. Packet abnormal reception determiner 123, abnormal reception counter updater 124, D-transmission-interruption-signal transmission determiner 125, AL-FEC decoder 126, video data output unit 127, and reply packet generator 128 are constituted using the CPU, the MPU, or the DSP.

In a case where the coded packets (that is, packets of the video data on which the error correction coding is performed at the application layer) of the video data transmitted from transmitting terminal 110 are received, packet receiver 121 as an example of a receiver stores the coded packets in reception packet buffer 122, and sends the coded packets to packet abnormal reception determiner 123.

For example, reception packet buffer 122 is constituted using a random access memory (RAM), and temporarily stores the coded packets received by packet receiver 121. The coded packets stored in reception packet buffer 122 are read by AL-FEC decoder 126 when the coded packets are decoded by AL-FEC decoder 126.

Packet abnormal reception determiner 123 determines whether or not the coded packets received from packet receiver 121 are abnormally received. For example, in a case where the coded packets are not received by packet receiver 121 within a predetermined time, packet abnormal reception determiner 123 determines that the packet loss (LOSS) occurs since the coded packets do not reach receiving terminal 120. For example, packet abnormal reception determiner 123 determines that the reception error (ERROR) occurs in the coded packets received by the packet receiver 121 through checking (for example, determination of whether calculation values of CRC codes match or do not match (the same is applied later)) using a cyclic redundancy check (CRC) of the coded packets. For example, in a case where the coded packets are received by packet receiver 121 within a predetermined time and an abnormality in the checking using the CRC of the coded packets is not found, packet abnormal reception determiner 123 determines that the coded packets received from packet receiver 121 are normally received. Packet abnormal reception determiner 123 sends the determination result related to the reception of the coded packets to abnormal reception counter updater 124.

Based on the determination result related to the reception of the coded packets from packet abnormal reception determiner 123, abnormal reception counter updater 124 as an example of a counter updates counter value $P_{NG}$ indicating that the coded packets received by packet receiver 121 are not normally received, and notifies D-transmission-interruption-signal transmission determiner 125 of the latest value of counter value $P_{NG}$. It is assumed that a counter value indicating that packet receiver 121 normally receives the coded packets is $P_{OK}$. Thus, abnormal reception counter updater 124 may also update counter value $P_{OK}$ indicating that packet receiver 121 normally receives the coded packets, and may notify D-transmission-interruption-signal transmission determiner 125 of the latest value of counter value $P_{OK}$.

D-transmission-interruption-signal transmission determiner 125 as an example of a reception controller is able to decode 100 (=k) packets of the video data when the above-described first condition is satisfied (that is, counter value $P_{NG}$ notified from abnormal reception counter updater 124 reaches 96 (=(n−k'+1)), but sends the AL-FEC decoding process start signal to AL-FEC decoder 126, and instructs reply packet generator 128 to generate the reply packet for requesting the transmission interruption of the coded packets since it is not necessary to transmit (n−k'+1) number of coded packets or more.

If the AL-FEC decoding process start signal from D-transmission-interruption-signal transmission determiner 125 is received at the application layer (Layer 7) of the OSI reference model, AL-FEC decoder 126 as an example of a decoder reads the coded packets received by packet receiver 121 from the reception packet buffer 122, performs the AL-FEC decoding the read coded packets, and sends 100 (=k) packets of the video data acquired through the decoding to video data output unit 127. Even though the above-described first condition is satisfied, AL-FEC decoder 126 reads the coded packets received by packet receiver 121 from reception packet buffer 122, and performs the AL-FEC decoding the read coded packets. In this case, since the AL-FEC decoder is not able to correctly perform the decoding and is able to acquire 100 (=k) packets of the video data, the quality of the video data is deteriorated like a case where the video data for 100 ms is distorted and reproduced.

Video data output unit 27 extracts the video data from 100 (=k) or less than 100 packets of the video data received from AL-FEC decoder 26, and outputs the extracted video data to a video codec (not shown). Thereafter, the video data from the video codec is output to a display (not shown).

In response to an instruction from D-transmission-interruption-signal transmission determiner 125, reply packet generator 128 generates the reply packet for requesting the transmission interruption of the coded packets, and sends the generated reply packet to reply packet transmitter 129.

If the reply packet for requesting the transmission interruption of the coded packets is received from reply packet generator 128, reply packet transmitter 129 as an example of a second transmitter transmits the reply packet to transmitting terminal 110.

Figure 19:
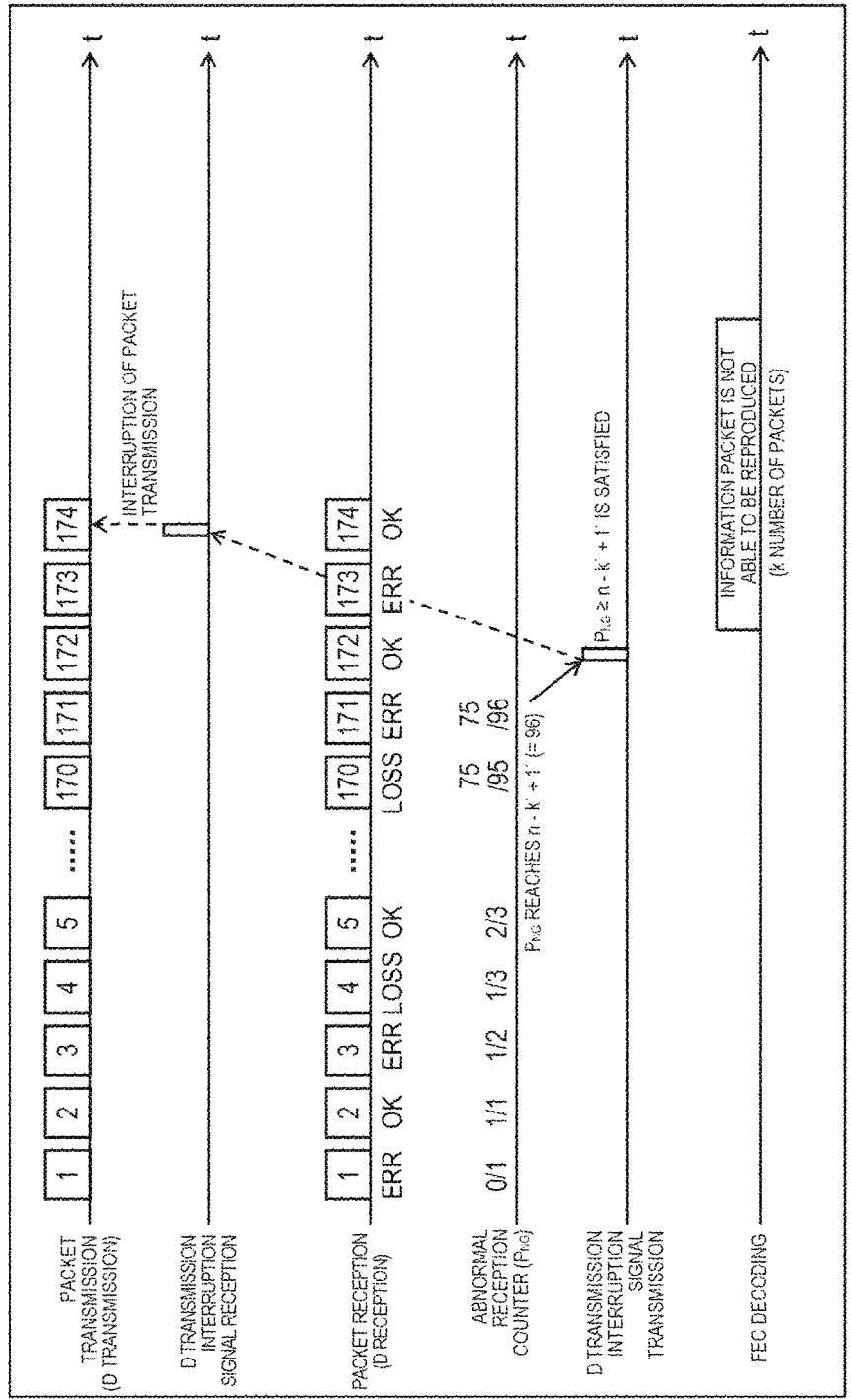
FIG. 19 is an explanatory diagram showing an example of operation outlines of the transmitting terminal and the receiving terminal according to the third exemplary embodiment.

Hereinafter, an operation outline of communication system 150 according to the present exemplary embodiment will be described with reference to FIG. 19. FIG. 19 is an explanatory diagram showing an example of operation outlines of transmitting terminal 110 and receiving terminal 120 according to the third exemplary embodiment.

A time chart related to the transmission of the coded packets transmitted from packet transmitter 113 is illustrated in a topmost row of FIG. 19, a time chart related to the acquisition of the D transmission interruption signal received from D-transmission-interruption-signal reception determiner 115 is illustrated in a second row from the top, a time chart related to the reception of the coded packets in packet receiver 121 is illustrated in a third row from the top, a time chart related to the updating of counter value $P_{NG}$ in abnormal reception counter updater 124 is illustrated in a fourth row from the top, a time chart related to the determination of the transmission of the reply packet in D-transmission-interruption-signal transmission determiner 125 is illustrated in a fifth row from the top, and a time chart related to the decoding of the packets (data packets) of the video data in AL-FEC decoder 126 is illustrated in a bottommost row.

In FIG. 19, the coded packet which is transmitted in first place is abnormally received by packet receiver 121 (specifically, the reception error occurs), and counter value $P_{NG}$ is updated to 1. The coded packet which is transmitted in second place is normally received by packet receiver 121, and counter value $P_{NG}$ is maintained at 1. The coded packet which is transmitted in third place is abnormally received by packet receiver 121 (specifically, the reception error occurs), and counter value $P_{NG}$ is updated to 2.

Similarly, it is assumed that the coded packet which is transmitted in 170th place is abnormally received by packet receiver 121 (specifically, the packet loss occurs), and counter value $P_{NG}$ is updated to 95. The coded packet which is transmitted in 171st place is abnormally received by packet receiver 121 (specifically, the reception error occurs), and counter value $P_{NG}$ is updated to 96. In this case, counter value $P_{NG}$ is updated to 96 (=(n−k'+1)), and D-transmission-interruption-signal transmission determiner 125 instructs reply packet generator 128 to transmit the reply packet (that is, packet for requesting the transmission interruption of the coded packets). Accordingly, receiving terminal 120 transmits the reply packet to transmitting terminal 110.

In response to the reception of the reply packet, D-transmission-interruption-signal reception determiner 115 sends the D transmission interruption signal to packet transmitter 113, and transmitting terminal 110 performs the transmission interruption of the coded packets. Based on the fact that counter value $P_{NG}$ reaches 96 (=(n−k'+1)), receiving terminal 120 reads 75 coded packets which are normally received and 96 (=(n−k'+1)) coded packets which are abnormally received from reception packet buffer 122, and performs the AL-FEC decoding on the read coded packets. Accordingly, receiving terminal 120 can start the decoding of the packets of the video data and can cause transmitting terminal 110 to interrupt the transmission of useless coded packets before the reception of the coded packets is completed without receiving all 200 (=n) coded packets generated by transmitting terminal 110.

Figure 20:
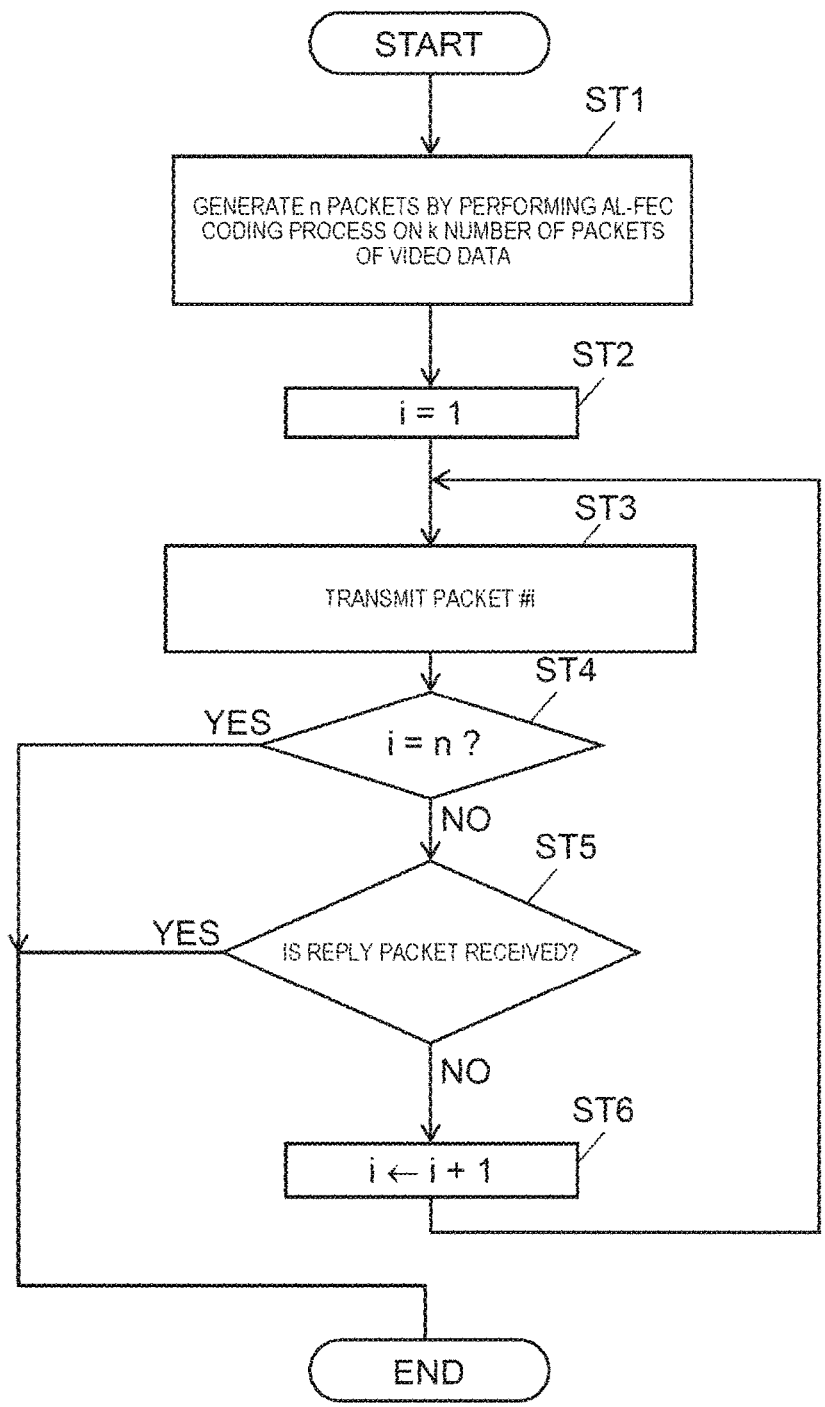
FIG. 20 is a flowchart for describing an example of an operation procedure of the transmitting terminal according to the third exemplary embodiment.

Hereinafter an operation procedure of transmitting terminal 110 according to exemplary embodiment will be described with reference to FIG. 20. FIG. 20 is a flowchart for describing an example of the operation procedure of transmitting terminal 110 according to the third exemplary embodiment. The flowchart shown in FIG. 20 relates to a process of transmitting 2,000,000 bits (200 packets) of coded packets for 100 ms once in a case where a transmission rate is 20 Mbps (in other words, transmitting terminal 10 transmits 2,000,000 bits of coded packets of the video data for 100 ms, for example) (see FIG. 17).

In FIG. 20, video data packet generator 111 generates k number of packets (video data packets) of the data (for example, video data) as the transmission target, and sends the generated packets to AL-FEC coder 112. AL-FEC coder 112 generates n (>k) number of coded packets by performing the error correction coding on k number of video data packets received from video data packet generator 111 by using the raptor codes at the application layer, and sends the generated coded packets to packet transmitter 113 (ST1).

D-transmission-interruption-signal reception determiner 115 initializes parameter i indicating the transmission order of the coded packets from packet transmitter 113 (ST2, i=1), generates the D transmission instruction signal for transmitting the coded packets, sends the generated D transmission instruction signal to packet transmitter 113, and transmits the coded packets. Packet transmitter 113 transmits a first (i=1) coded packet in response to the D transmission instruction signal from D-transmission-interruption-signal reception determiner 115 (ST3).

In a case where it is satisfied that parameter i=n (for example, 200) (ST4, YES). D-transmission-interruption-signal reception determiner 115 ends the flowchart shown in FIG. 20, and instructs packet transmitter 113 to transmit 200 coded packets for next 100 ms.

Meanwhile, in a case where it is not satisfied that parameter i=n (for example, 200) (ST4, NO), D-transmission-interruption-signal reception determiner 115 determines whether or not the reply packet is received from receiving terminal 120 (ST5).

In a case where it is determined that the reply packet is not received (ST5, NO), D-transmission-interruption-signal reception determiner 115 increments parameter i (ST6), generates the D transmission instruction signal for transmitting the coded packets, sends the generated D transmission instruction signal to packet transmitter 113, and transmits the coded packets.

Meanwhile, in a case where it is determined that the reply packet is received (ST5, YES), D-transmission-interruption-signal reception determiner 115 generates the D transmission interruption signal, sends the generated D transmission interruption signal to packet transmitter 113, and interrupts the transmission of the coded packets.

Figure 21:
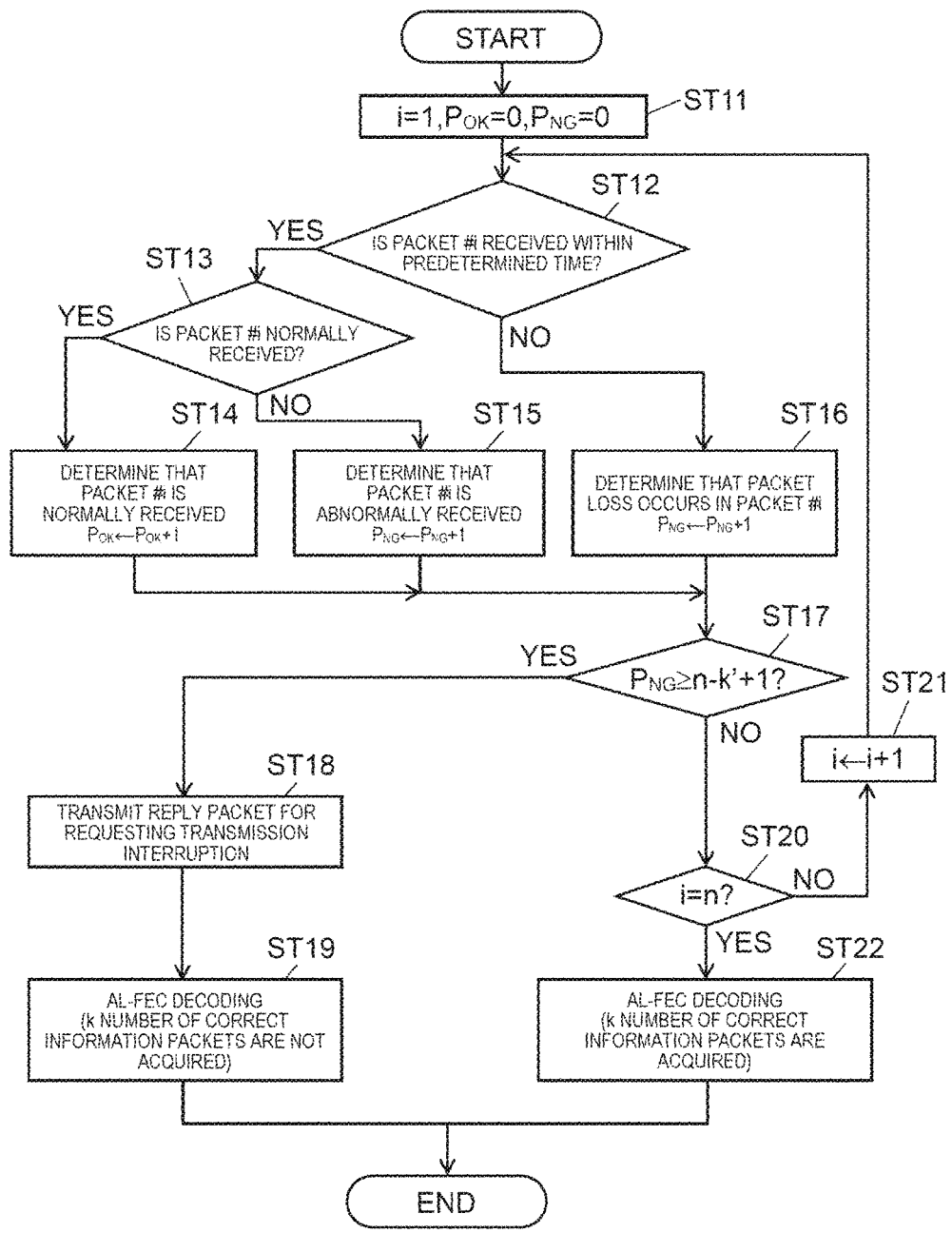
FIG. 21 is a flowchart for describing an example of an operation procedure of the receiving terminal according to the third exemplary embodiment.

Hereinafter, an operation procedure of receiving terminal 120 according to the present exemplary embodiment will be described with reference to FIG. 21. FIG. 21 is a flowchart for describing an example of the operation procedure of receiving terminal 120 according to the third exemplary embodiment. The flowchart shown in FIG. 21 relates to a process of receiving 2,000,000 bits (200 packets) of coded packets for 100 ms once in a case where a transmission rate is 20 Mbps (in other words, transmitting terminal 110 transmits 2,000,000 bits of coded packets of the video data for 100 ms, for example) (see FIG. 17).

In FIG. 21, D-transmission-interruption-signal transmission determiner 125 initializes parameter i indicating the transmission order of the coded packets from packet transmitter 113 (ST11, i=1), and sets counter value $P_{OK}$ indicating that packet receiver 121 normally receives the coded packets and counter value $P_{NG}$ indicating that packet receiver 121 is not able to normally receive the coded packets to be zero (ST11, $P_{OK}=P_{NG}=0$). In FIG. 21, the coded packet which is transmitted in i-th place is described "packet #i" for the sake of convenience, and the same is true of the following exemplary embodiments.

In a case where packet receiver 121 receives the coded packet (packet #i) within a predetermined time (ST12, YES), packet abnormal reception determiner 123 determines whether or not the received coded packet (packet #i) is normally received (ST13), and sends the determination result to abnormal reception counter updater 124. In a case where it is determined that the coded packet (packet #i) is normally received (ST13, YES), abnormal reception counter updater 124 increments counter value $P_{OK}$ set in step ST11 (ST14). Meanwhile, in a case where it is determined that the coded packet (packet #i) is not able to be normally received (ST13, NO), since the reception error occurs in the coded packet (for example, the CRC checks do not match), abnormal reception counter updater 124 increments counter value $P_{NG}$ set in step ST11 (ST15).

Meanwhile, in a case where packet receiver 121 does not receive the coded packet (packet #i) within a predetermined time (for example, 0.5 ms (=100 ms/200 packets)) (ST12, NO), packet abnormal reception determiner 123 determines that the packet loss (LOSS) occurs since the coded packet does not reach receiving terminal 120, and sends the determination result to abnormal reception counter updater 124. Abnormal reception counter updater 124 increments counter value $P_{NG}$ set in step ST11 (ST16).

In a case where counter value $P_{NG}$ is equal to or greater than (n−k'+1) (=96) (ST17, YES), since receiving terminal 120 is not able to perform the AL-FEC decoding on k number of packets of the video data at this point of time and it is not necessary to transmit (n−k'+1) number of coded packets or more from transmitting terminal 110, D-transmission-interruption-signal transmission determiner 125 instructs reply packet generator 128 to transmit the reply packet for requesting the transmission interruption of the coded packets. In response to an instruction from D-transmission-interruption-signal transmission determiner 125, reply packet generator 128 generates the reply packet for requesting the transmission interruption of the coded packets, and sends the generated reply packet to reply packet transmitter 129. If the reply packet for requesting the transmission interruption of the coded packets is received from reply packet generator 128, reply packet transmitter 129 transmits the reply packet to transmitting terminal 110 (ST18). D-transmission-interruption-signal transmission determiner 125 sends the AL-FEC decoding process start signal to AL-FEC decoder 126. If the AL-FEC decoding process start signal from D-transmission-interruption-signal transmission determiner 125 is received at the application layer, AL-FEC decoder 126 reads the coded packets which are already received normally or abnormally from reception packet buffer 122 and performs the AL-FEC decoding, but the packets of the video data are not acquired in this case (ST19). Thus, the quality of the video data is deteriorated like a case where the video data is distorted and reproduced for 100 ms.

Meanwhile, in a case where counter value $P_{NG}$ is not equal to or greater than (n−k'+1) (=96) (ST17, NO), if parameter i does not match n (=200) indicating the maximum number of coded packets to be transmitted (ST20, NO), D-transmission-interruption-signal transmission determiner 125 increments parameter i (ST19). After step ST19, the process of receiving terminal 20 returns to step ST12.

Meanwhile, in a case where counter value $P_{NG}$ is not equal to or greater than (n−k'+1) (=96) (ST17, NO) and also in a case where parameter i matches n (=200) indicating the maximum number of coded packets to be transmitted (ST20, YES), D-transmission-interruption-signal transmission determiner 125 sends the AL-FEC decoding process start signal to AL-FEC decoder 126. In this case, since k' number of coded packets are acquired, AL-FEC decoder 126 can correctly decode k number of packets of the video data through the AL-FEC decoding by using k' number of coded packets. Accordingly, the video data is correctly output (for example, reproduced) from video data output unit 27 for 100 ms.

As described above, for example, in communication system 150 according to the present exemplary embodiment, transmitting terminal 110 generates n (for example, 200) coded packets by performing the coding (AL-FEC coding) on k (for example, 100) packets (data packets) of the video data as the transmission target in the application requiring the real-time capabilities, and sequentially transmits the coded packets to receiving terminal 120 in response to a transmission instruction of the coded packets from D-transmission-interruption-signal reception determiner 115. Receiving terminal 120 receives the coded packets transmitted from transmitting terminal 110, and transmits the reply packet for requesting the transmission interruption of the coded packets to transmitting terminal 110 in a case where a first condition (that is, (n−k'+1) (for example, 96) number of coded packets are not able to be normally received) in which the coded packets are not able to be decoded in AL-FEC decoder 126 is satisfied. In a case where the reply packet is received, D-transmission-interruption-signal reception determiner 115 determines the transmission interruption of coded packets, and transmitting terminal 110 causes packet transmitter 113 to interrupt the transmission of the coded packets.

Accordingly, since communication system 150 can control the transmission amount of packets on which the AL-FEC coding is performed by the application requiring the real-time capabilities depending on the state of the communication transmission path of the unicast communication between transmitting terminal 110 and receiving terminal 120, it is possible to suppress the increase in the packet transmission amount in the communication transmission path. That is, in a case where the reply packet for requesting the transmission interruption of the coded packets is received from receiving terminal 120 before all n (for example, 200) coded packets are transmitted, since transmitting terminal 110 interrupts the transmission of the coded packets without transmitting all n number of coded packets, it is possible to reduce the transmission amount of coded packets, and it is possible to effectively use the wireless band.

In communication system 150, since receiving terminal 120 counts the number of abnormally received coded packets and is not able to correctly decode k (for example, 100) packets of the video data by using a plurality of already received coded packets in a case where the counted value is (n−k'+1) (for example, 96), the transmission of k number of coded packets is useless, and thus, receiving terminal 120 transmits the reply packet for requesting the transmission interruption of the coded packets from reply packet transmitter 129. Accordingly, in a case where the raptor codes are used in the AL-FEC coding, receiving terminal 120 can suppress the increase in the transmission amount of coded packets transmitted from transmitting terminal 110.

In communication system 150, receiving terminal 120 instructs AL-FEC decoder 126 to decode k (for example, 100) number of packets (data packets) of the video data using the plurality of already received coded packets. According, receiving terminal 120 is not able to decode k number of packets of the video data in a case where the number of coded packets which are abnormally received reaches (n−k'+1) but it is not necessary to receive n (for example, 200) number of coded packets generated by transmitting terminal 110. Thus, it is possible to suppress the increase in the useless transmission amount of the coded packets from transmitting terminal 110, and it is possible to contribute to early transmission of the coded packets for next 100 ms.

Fourth Exemplary Embodiment

Next, in the case of multi-cast communication in which the coded packets are transmitted to a plurality of receiving terminals from one transmitting terminal in a simultaneous broadcasting manner, there is a high possibility that the number of coded packets capable of being normally received will be different between the respective receiving terminals depending on the positional relationships (for example, distances or presence or absence of an obstacle in the case of the wireless communication or a congestion state of communication paths in the case of the wired communication) between the transmitting terminal and the respective receiving terminals. In other words, the receiving terminals of which the reception states of the coded packets transmitted from the transmitting terminal are favorable and the receiving terminals of which the reception states are not favorable may be mixed in some arrangements of the transmitting terminal and the respective receiving terminals.

In order for the receiving terminal having a low normal reception rate to correctly decode the coded packets, a ratio (a so-called code rate (=k/n)) of the packets (k packets) of the video data to the coded packets (n packets) may be set to be low. However, if the code rate is set to be low in this manner, since n is increased, there is a problem that the transmission amount of coded packets is increased. Even though most receiving terminals demonstrate that $P_{NG} \geq k'$, since some receiving terminals of which the reception states are favorable are present, there is a problem that the transmission amount of coded packets from the transmitting terminal is increased.

Thus, in the fourth exemplary embodiment, an example of the communication system which solves the above-described problems and is applied to the multi-cast communication in which the coded packets are transmitted to a plurality of receiving terminals from one transmitting terminal in a simultaneous broadcasting manner will be described. More specifically, in the communication system according to the present exemplary embodiment, the transmitting terminal dynamically sets the number B of remaining coded packets to be transmitted in a case where the number Y of receiving terminals that transmit the reply packet for requesting the transmission interruption of the coded packets is equal to or greater than default value N' (<N) based on the fact that the number of abnormally received coded packets in each receiving terminal reaches (n−k'+1) in the multi-cast communication for N (for example, 80) number of receiving terminals. In a case where the number B of set coded packets to be transmitted is zero, the transmitting terminal interrupts the transmission of the coded packets to packet transmitter 113.

Figure 22:
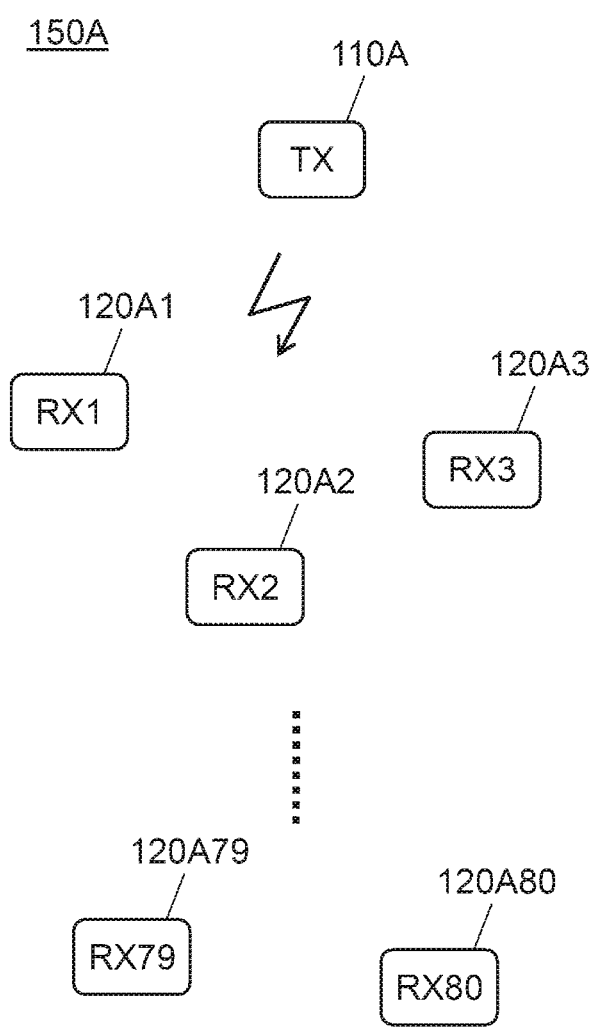
FIG. 22 is a schematic diagram showing an example of a state of the delivery of video data in a communication system according to a fourth exemplary embodiment.

FIG. 22 is a schematic diagram showing an example of a state of the delivery of the video data in communication system 150A according to the fourth exemplary embodiment. FIG. 23 is a diagram showing an example of the correspondence between receiving terminals 120A1 to 120A80 and the number of packets #i satisfying that counter value $P_{NG} \geq (n-k'+1)$. As shown in FIG. 22, communication system 150A according to the present exemplary embodiment is configured such that one transmitting terminal 110A and a plurality (for example, N=80) of receiving terminals 120A1 to 120A80 are connected via a network like a video delivery service within an airplane. Since an internal configuration of each of receiving terminals 120A1 to 120A80 is the same as the configuration of receiving terminal 120 described in the third exemplary embodiment, the description of the detailed operation of each receiving terminal will be omitted, and the details related to the operation of transmitting terminal 110A will be described (see FIG. 18).

In FIG. 23, receiving terminals 120A1 to 120A3 demonstrate that it is not satisfied that counter value $P_{NG} \geq (n-k'+1)$ even though a 200th (=n-th) coded packet is received, receiving terminal 120A4 similarly demonstrates that counter value $P_{NG} \geq (n-k'+1)$ when a 197th coded packet is received, receiving terminal 120A77 demonstrates that counter value $P_{NG} \geq (n-k'+1)$ when a 165th coded packet is received, receiving terminal 120A78 demonstrates that counter value $P_{NG} \geq (n-k'+1)$ when a 121st coded packet is received, receiving terminal 120A79 demonstrates that counter value $P_{NG} \geq (n-k'+1)$ when a 96th coded packet is received, and receiving terminal 120A80 demonstrates that counter value $P_{NG} \geq (n-k'+1)$ when a 103rd coded packet is received. In FIG. 23, since receiving terminal 120A79 demonstrates that counter value $P_{NG} \geq 96$ (=n-k'+1) when the 96th coded packet is received, it can be seen that all the coded packets transmitted from transmitting terminal 110A are not normally received.

Hereinafter, the details of communication system 150A according to the present exemplary embodiment will be described in detail.

Figure 24:
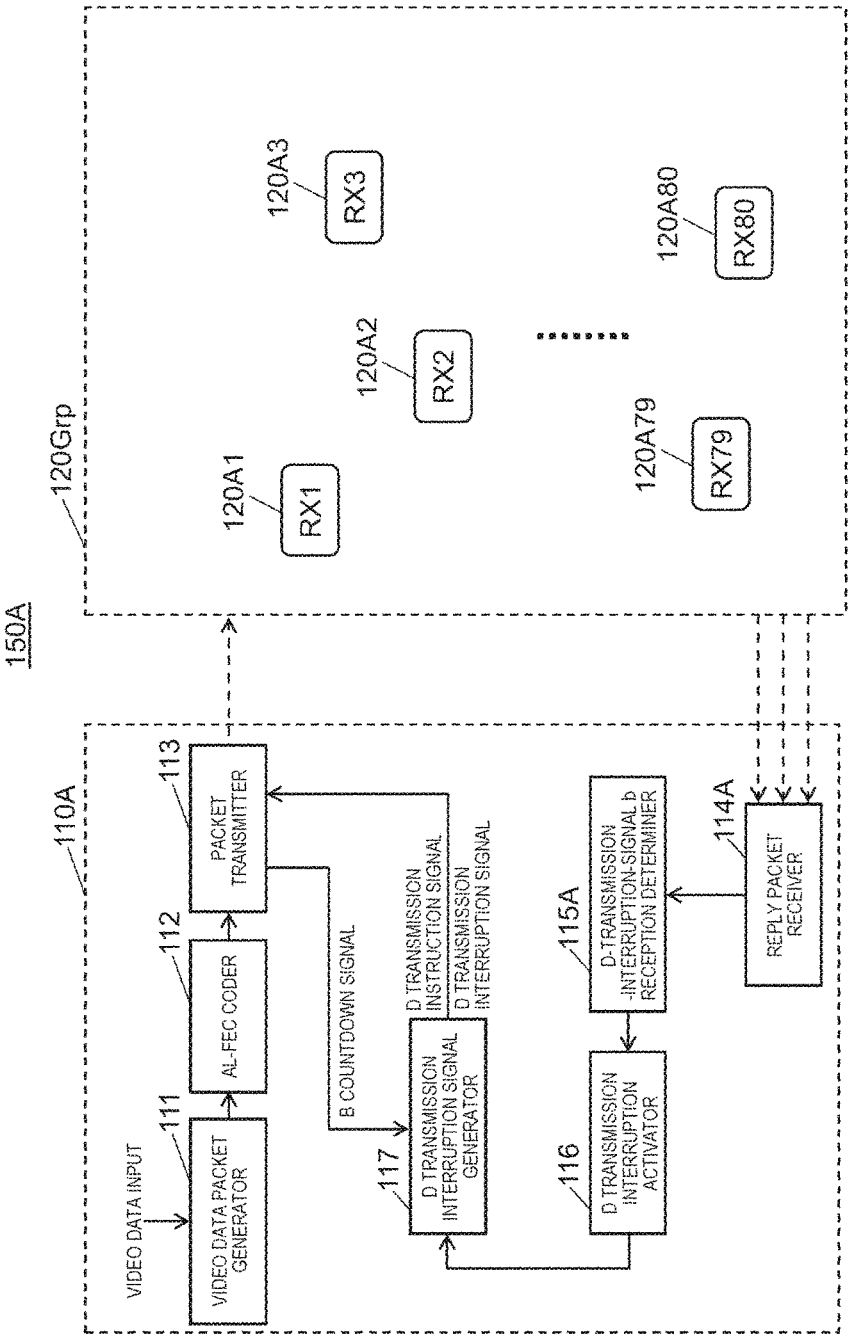
FIG. 24 is a block diagram showing an example of an internal configuration of the transmitting terminal of the communication system according to the fourth exemplary embodiment.

FIG. 24 is a block diagram showing an example of an internal configuration of the transmitting terminal of communication system 150A according to the fourth exemplary embodiment. Communication system 150A according to the present exemplary embodiment will be described in conjunction with the multi-cast communication between one transmitting terminal 110A and receiving terminal group 120Grp including a plurality (for example, 80) of receiving terminals 120A1 to 120A80.

Transmitting terminal 110A shown in FIG. 24 includes video data packet generator 111, AL-FEC coder 112, packet transmitter 113, reply packet receiver 114A, D-transmission-interruption-signal b reception determiner 115A, D transmission interruption activator 116, and D-transmission-interruption-signal generator 117. Transmitting terminal 110A is not limited to have only the configurations of the respective units shown in FIG. 24. For example, video data packet generator 111, AL-FEC coder 112, D-transmission-interruption-signal b reception determiner 115A, D transmission interruption activator 116, and D-transmission-interruption-signal generator 117 are constituted using the CPU, the MPU, or the DSP.

In a case where the reply packets transmitted from receiving terminals 120A1 to 120A80 are received, reply packet receiver 114A sends the reply packets to D-transmission-interruption-signal b reception determiner 115A.

D-transmission-interruption-signal b reception determiner 115A as an example of a transmission controller determines the transmission or the transmission interruption of the coded packets generated by AL-FEC coder 12 for receiving terminals 120A1 to 120A80. D-transmission-interruption-signal b reception determiner 115A counts parameter Y equivalent to the number of received reply packets for requesting the transmission interruption of the coded packets from receiving terminal group 120Grp based on the fact that the number of abnormally received coded packets reaches (n-k'+1), and determines to transmit only B number of coded packets later and interrupt the transmission of the coded packets after B number of coded packets are transmitted in a case where parameter Y reaches default value N' (a value which is less than N and is, for example, 75). D-transmission-interruption-signal b reception determiner 115A sends an instruction to update and set parameter B indicating the transmission number to D transmission interruption activator 116.

D transmission interruption activator 116 as an example of a transmission number setter updates and sets parameter B indicating the number of coded packets to be transmitted as follows in response to an instruction from D-transmission-interruption-signal b reception determiner 115A. For example, D transmission interruption activator 116 selects a smaller value of a predetermined value (for example, a current value of parameter B) and a calculation value (for example, B=3(N-Y)) in consideration of parameter Y, as parameter B, and sets and updates this parameter. D transmission interruption activator 116 sends information related to parameter B to D-transmission-interruption-signal generator 117.

In response to the information related to parameter B received from D transmission interruption activator 116, D-transmission-interruption-signal generator 117 generates the D transmission instruction signal while parameter B is not zero, sends the generated D transmission instruction signal to packet transmitter 113, and transmits the coded packets. D-transmission-interruption-signal generator 117 receives a B countdown signal for decreasing parameter B by one and updates parameter B whenever packet transmitter 113 transmits the coded packet. After parameter B is zero by receiving the B countdown signal a predetermined number of times, D-transmission-interruption-signal generator 117 generates the D transmission interruption signal, sends the generated D transmission interruption signal to packet transmitter 113, and interrupts the transmission of the coded packets.

Figure 25:
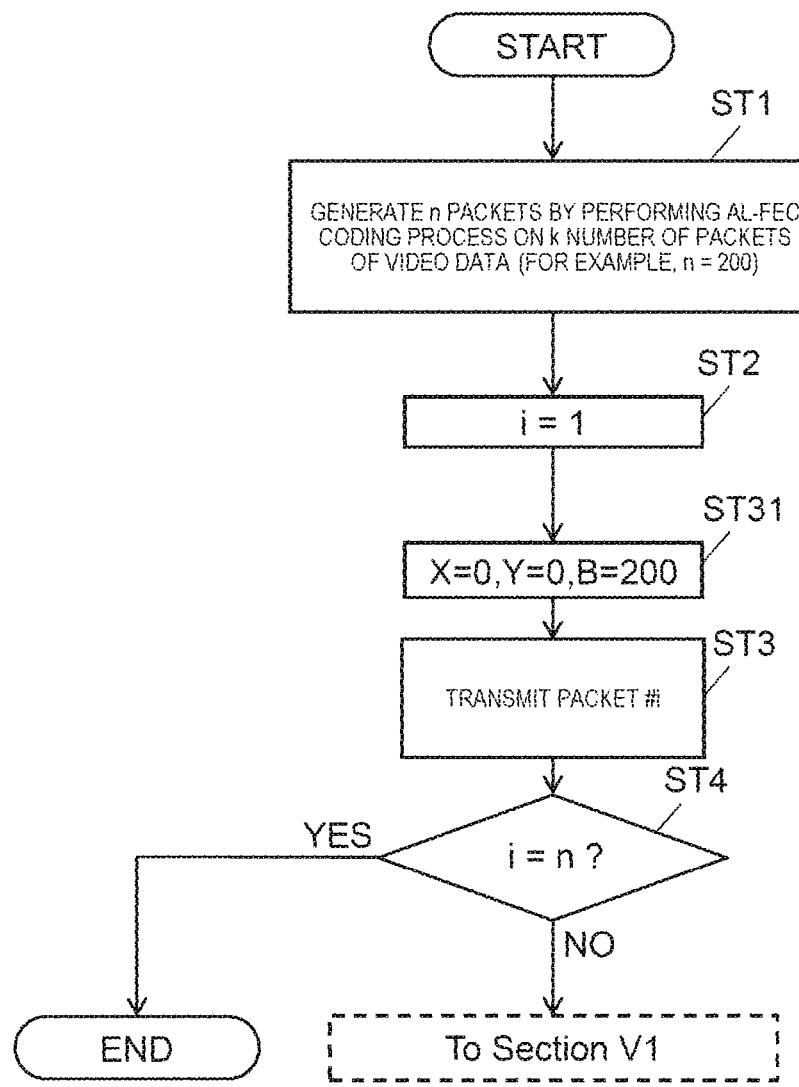
FIG. 25 is a flowchart for describing an example of an operation procedure of the transmitting terminal according to the fourth exemplary embodiment.
Figure 26:
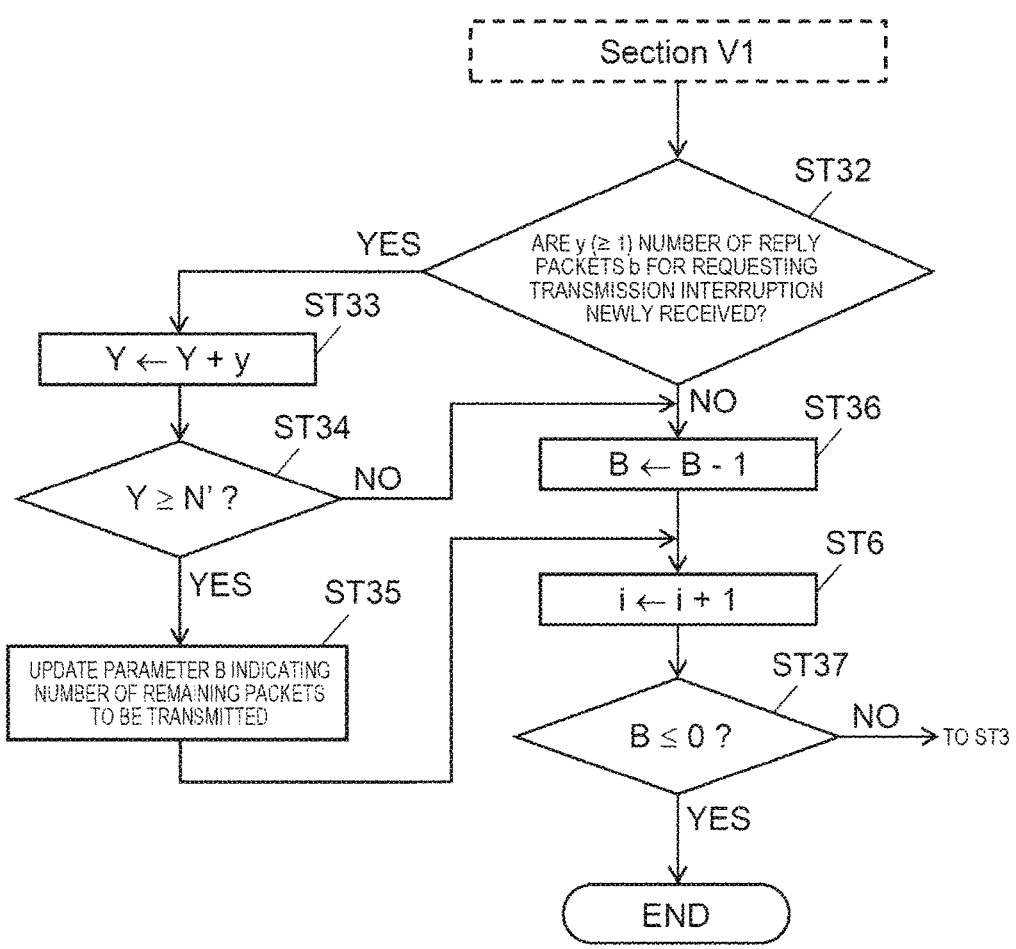
FIG. 26 is a flowchart for describing an example of the operation procedure of the transmitting terminal subsequently to FIG. 25.

Hereinafter, an operation procedure of transmitting terminal 110A according to the present exemplary embodiment will be described with reference to FIGS. 25 and 26. FIG. 25 is a flowchart for describing an example of the operation procedure of transmitting terminal 110A according to the fourth exemplary embodiment. FIG. 26 is a flowchart for describing an example of the operation procedure of transmitting terminal 110A subsequently to FIG. 25. The flowcharts shown in FIGS. 25 and 26 relate to a process of transmitting 2,000,000 bits (200 packets) of coded packets for 100 ms once in a case where a transmission rate is 20 Mbps (in other words, transmitting terminal 110A transmits 2,000,000 bits of coded packets of the video data for 100 ms, for example) (see FIG. 17). In FIGS. 25 and 26, the same processes as the respective processes shown in FIG. 21 will be assigned the same step numbers, and the description thereof will be simplified and omitted. Different content will be described.

In FIG. 25, after step ST2, D-transmission-interruption-signal b reception determiner 115A initializes parameter X equivalent to the number of received reply packets for requesting the transmission interruption of the coded packets from receiving terminal group 120Grp depending on the fact that the number of normally received coded packets reaches k' and parameter Y equivalent to the number of received reply packets for requesting the transmission interruption of the coded packets from receiving terminal group 120Grp depending on the fact that the number of abnormally received coded packets reaches (n-k'+1) (ST31, X=Y=0).

D-transmission-interruption-signal b reception determiner 115A sets parameter B indicating the number of coded packets to be transmitted to be 200, and sends the information related to parameter B to D transmission interruption activator 116 (ST31). D transmission interruption activator 116 selects a smaller value of a current value (200) of parameter B and a calculation value (for example, B=3(N−Y)) in consideration of parameter Y, as parameter B, and sets and updates the parameter. Accordingly, D transmission interruption activator 116 sends information indicating that parameter B=200 to D-transmission-interruption-signal generator 117. After step ST31, in response to the information related to parameter B received from D transmission interruption activator 116, D-transmission-interruption-signal generator 117 generates the D transmission instruction signal, sends the generated D transmission instruction signal to packet transmitter 113, and transmits the coded packets (ST3).

In FIG. 26, in a case where it is not satisfied that parameter i=n (for example, 200) (ST4, NO), D-transmission-interruption-signal b reception determiner 115A determines whether or not y (≥1) number of reply packets b for requesting the transmission interruption are newly received from receiving terminal group 120Grp whenever packet transmitter 113 transmits one coded packet (packet #i) (ST32). Here, reply packets b indicate the reply packets for requesting the transmission interruption of the coded packets from receiving terminal group 120Grp based on the fact that the number of abnormally received coded packets reaches (n−k'+1).

In a case where it is determined that y (≥1) number of reply packets b for requesting the transmission interruption are newly received from receiving terminal group 120Grp (ST32, YES), D-transmission-interruption-signal b reception determiner 115A updates parameter Y equivalent to the number of received reply packets b for requesting the transmission interruption of coded packets from receiving terminal group 120Grp to (Y+y) based on the fact that the number of abnormally received coded packets reaches (n−k'+1) (ST33). D-transmission-interruption-signal b reception determiner 115A determines whether or not the latest value of parameter Y is equal to or greater than default value N' (a value which is less than N and is, for example, 75) (ST34).

In a case where it is determined that the latest value of parameter Y is equal to or greater than default value N' (a value which is less than N and is, for example, 75) (ST34, YES), D-transmission-interruption-signal b reception determiner 115A determines to transmit only B number of coded packets later and interrupt the transmission of the coded packets after B number of coded packets are transmitted. D-transmission-interruption-signal b reception determiner 115A sends an instruction to update and set parameter B indicating the transmission number to D transmission interruption activator 116. D transmission interruption activator 116 updates and sets parameter B indicating the number of coded packets to be transmitted in response to an instruction from D-transmission-interruption-signal b reception determiner 115A (ST35).

Meanwhile, in a case where y number of reply packets for requesting the transmission interruption are not newly received from receiving terminal group 120Grp whenever packet transmitter 113 transmits one coded packet (packet #i) (ST32, NO) or in a case where the latest value of parameter Y is less than default value N' (a value which is less than N and is, for example, 75) (ST34, NO), packet transmitter 113 generates the B countdown signal, and sends the generated B countdown signal to D-transmission-interruption-signal generator 117. Accordingly, D-transmission-interruption-signal generator 117 receives the B countdown signal of parameter B from packet transmitter 113, and updates parameter B by decreasing this parameter by one (ST36).

After step ST35 or step ST36, D-transmission-interruption-signal generator 117 increments parameter i (ST6), generates the D transmission instruction signal for transmitting the coded packets, sends the generated D transmission instruction signal to packet transmitter 113, and transmits the coded packets. In a case where parameter B is zero (ST37, YES), D-transmission-interruption-signal generator 117 generates the D transmission interruption signal, sends the generated D transmission interruption signal to packet transmitter 113, and interrupts the transmission of the coded packets. Meanwhile, in a case where parameter B is not zero (ST37, NO), the process of transmitting terminal 110A returns to step ST3.

As described above, in communication system 150A according to the present exemplary embodiment, transmitting terminal 110A dynamically sets parameter B indicating the number of remaining coded packets to be transmitted in a case where parameter Y indicating the number of receiving terminals that transmit reply packets b for requesting the transmission interruption of the coded packets is equal to or greater than default value N' (<N (=80) and is, for example, 75) based on the fact that the number of abnormally received coded packets in receiving terminal group 120Grp reaches (n−k'+1) (for example, 96) in the multi-cast communication for N (for example, 80) number of receiving terminals 120A1 to 120A80. In a case where parameter B indicating the number of set coded packets to be transmitted is zero, transmitting terminal 110A causes packet transmitter 113 to interrupt the transmission of the coded packets.

Accordingly, communication system 150A can control the transmission amount of packets on which the AL-FEC coding is performed by the application requiring the real-time capabilities depending on the state of the communication transmission path of the multi-cast communication between one transmitting terminal 110A and the plurality of receiving terminals 120A1 to 120A80. In other words, since communication system 150A transmits only B number of remaining coded packets when parameter Y indicating the number of receiving terminals that transmit reply packets b is equal to or greater than default value N' even though a probability that some receiving terminals of which the communication transmission path is favorable will transmit k' number of coded packets or more is decreased to some extent, it is possible to suppress the increase in the packet transmission amount in the communication transmission path between transmitting terminal 110A and each receiving terminal. That is, in a case where the number (that is, Y) of received reply packets b for requesting the transmission interruption of the coded packets from the receiving terminals is equal to or greater than default value N' before all n number of coded packets are transmitted, since transmitting terminal 110A interrupts the transmission of the coded packets without transmitting all n number of coded packets, it is possible to reduce the communication amount of coded packets to be transmitted, and it is possible to effectively use the wireless band.

In communication system 150A, transmitting terminal 110A selects a smaller value of a predetermined value (for example, a current value of parameter B indicating the transmission number) and a calculation value corresponding to parameter Y indicating the number of receiving terminals that transmit reply packets b for requesting the transmission interruption of the coded packets based on the fact that the number of abnormally received coded packets reaches (n−k'=1) (for example, 96) in receiving terminal group 120Grp, as the number of remaining coded packets B to be transmitted. Accordingly, since transmitting terminal 110A sets the number B of remaining coded packets to be transmitted in consideration of parameter Y indicating the number of receiving terminals of which the abnormal reception number reaches (n−k'+1) with which the AL-FEC decoding of the coded packets is not able to be performed, it is possible to adaptively select the transmission amount of coded packets.

Although various exemplary embodiments have been described with reference to the drawings, the present disclosure is not limited to these embodiments. It is to be appreciated that those skilled in the art can variously change or modify the embodiments without departing from the scope described in claims, and it is understood that such changes or modifications would fall within the scope of the present disclosure.

In the third exemplary embodiment, counter value $P_{OK}$ indicating that receiving terminal 120 normally receives the coded packets or counter value $P_{NG}$ indicating that the receiving terminal is not able to normally receive the coded packets are counted and counter value $P_{NG}$ reaches a predetermined value (for example, n−k'+1=96), and thus, the reply packets for requesting the transmission interruption of the coded packets are transmitted to transmitting terminal 110. Here, transmitting terminal 110 does not necessarily interrupt the transmission of the coded packets only in a case where receiving terminal 120 transmits the reply packet. For example, the receiving terminal may transmit a response indicating whether or not the coded packet is normally received to transmitting terminal 110 whenever receiving terminal 120 normally receives or is not able to normally receive the coded packets, and transmitting terminal 110 may interrupt the transmission of the coded packets in a case where counter value $P_{NG}$ reaches a predetermined value (for example, n−k'+1=96) (see the fourth exemplary embodiment).

Although it has been described in the fourth exemplary embodiment that it is assumed that transmitting terminal 110A knows the number (equivalent to parameter N) (for example, 80) of receiving terminals in the multi-cast communication, transmitting terminal 110A may know the number of receiving terminals in a case where the transmitting terminal does not know the number of receiving terminals of the receiving terminal group. For example, transmitting terminal 110A transmits all n (=200) number of coded packets. In this case, reply packets a or reply packets b are transmitted to transmitting terminal 110A from the receiving terminals of receiving terminal group 120Grp. Here, reply packets a indicate the reply packets for requesting the transmission interruption of the coded packets from receiving terminal group 120Grp based on the fact that the number of normally received coded packets reaches k'. Accordingly, transmitting terminal 110A can recognize parameter N indicating the number of receiving terminals of receiving terminal group 120Grp by setting the sum (X+Y) of parameters X and Y=N. Here, since there is a possibility that parameter N indicating the number of receiving terminals of receiving terminal group 120Grp will vary with time, it is preferable that transmitting terminal 110A acquires the latest value of N by regularly transmitting all n number of coded packets.

In the fourth exemplary embodiment, in a case where reply packets a or reply packets b are not received within a predetermined time after the coded packets are transmitted, transmitting terminal 110A may interrupt the transmission of the coded packets.

INDUSTRIAL APPLICABILITY

The present disclosure is useful as a communication system, a transmitting device, and a receiving device which suppress an increase in a packet transmission amount in a communication transmission path by controlling the transmission amount of packets on which error correction coding is performed by an application requiring real-time capabilities depending on a state of the communication transmission path.

REFERENCE MARKS IN THE DRAWINGS 10, 10B, 10C transmitting terminal
11 video data packet generator
12 AL-FEC coder
13 packet transmitter
14, 14A, 14B, 14C reply packet receiver
15 D-transmission-interruption-signal reception determiner
15B D-transmission-interruption-signal a reception determiner
15C D-transmission-interruption-signal a/D-transmission-interruption-signal b reception determiner
16, 16C D transmission interruption activator
17 D transmission interruption signal generator
20, 20A, 20B1, 20B2, 20B3, 20B79, 20B80, 20C1, 20C2, 20C3, 20C79, 20C80 receiving terminal
20Grp, 20GrpC receiving terminal group
21 packet receiver
22 reception packet buffer
23 packet normal reception determiner
24 normal reception counter updater
24A packet counter updater
25 D-transmission-interruption-signal transmission determiner
26 AL-FEC decoder
27 video data output unit
28 reply packet generator
29 reply packet transmitter
50, 50A, 50B, 50C communication system
110, 110A transmitting terminal
111 video data packet generator
112 AL-FEC coder
113 packet transmitter
114, 114A reply packet receiver
115 D-transmission-interruption-signal reception determiner
115A D-transmission-interruption-signal b reception determiner
116 D transmission interruption activator
117 D transmission interruption signal generator
120, 120A1, 120A2, 120A3, 120A79, 120A80 receiving terminal
120Grp receiving terminal group
121 packet receiver
122 reception packet buffer
123 packet abnormal reception determiner
124 abnormal reception counter updater
125 D-transmission-interruption-signal transmission determiner
126 AL-FEC decoder
127 video data output unit 128 reply packet generator
129 reply packet transmitter
150, 150A communication system

The invention claimed is:

1. A communication system for real time communication in which a transmitting device and at least one receiving device are connected to each other,
wherein the transmitting device includes
a packet generator that generates k (k: an integer of 2 or more) number of data packets as transmission targets,
a coder that generates n (>k) number of coded packets by coding the k number of generated data packets,
a transmission controller that instructs that the coded packets are to be transmitted or the transmission of the coded packets is to be interrupted, and
a first transmitter that sequentially transmits the n number of the generated coded packets in response to a transmission instruction from the transmission controller, wherein each of the coded packets is transmitted per a defined time period T to achieve real time communication,
the receiving device includes
a receiver that receives the transmitted coded packets,
a decoder that decodes the received coded packets,
a parameter i indicative of a sequential number of the coded packets received,
a first counter $P_{OK}$ that counts a number of the coded packets that are normally received,
a second counter $P_{NG}$ that counts a number of the coded packets that are abnormally received,
a reception controller that,
when the i-th coded packet is received within the defined time period T, determines whether the i-th coded packet is normally received or abnormally received, and increments the first counter $P_{OK}$ by 1 when the i-th coded packet is determined to be normally received and increments the second counter $P_{NG}$ by 1 when the i-th coded packet is determined to be abnormally received,
when the i-th coded packet is not received within the defined time period T, determines the i-th coded packet is lost and increments the second counter $P_{NG}$ by 1, and
a second transmitter that transmits a transmission interruption request packet for requesting transmission interruption of the coded packets to the transmitting device responsive to a number counted by the first counter $P_{OK}$ meeting or exceeding a number k'($\geq$k) indicating that a sufficient number of the coded packets are normally and timely received to achieve real time communication, and
the transmission controller of the transmitting device causes the first transmitter to interrupt the transmission of the coded packets in response to the transmission interruption request packet.

2. The communication system of claim 1,
wherein the reception controller instructs the decoder to decode the k number of data packets using the k' number of normally received coded packets.

3. The communication system of claim 1,
wherein
the reception controller instructs the second transmitter to transmit the transmission interruption request packet responsive to a number counted by the second counter $P_{NG}$ meeting or exceeding (n−k'+1).

4. The communication system of claim 1,
wherein N (N: an integer of 2 or more) number of receiving devices are connected with the transmitting device,
the transmitting device further includes
a transmission number setter that sets the number A (0$\leq$A<N) of coded packets to be transmitted in a case where the number X (1$\leq$X$\leq$N) of receiving devices that transmit the transmission interruption request packet is equal to or greater than a default value N' (<N), and
the transmission controller causes the first transmitter to interrupt the transmission of the coded packets in a case where the number A of set coded packets to be transmitted is zero.

5. The communication system of claim 4,
wherein the transmission number setter selects a smaller value of a predetermined value and a calculation value corresponding to the number X of receiving devices that transmit the transmission interruption request packet, as the number A of coded packets.

6. The communication system of claim 3,
wherein N (N: an integer of 2 or more) number of receiving devices are connected with the transmitting device,
the transmitting device further includes
a transmission number setter that sets the number C of coded packets to be transmitted in a case where the sum of the number X (1$\leq$X$\leq$N) of receiving devices that transmit a first transmission interruption request packet responsive to the number counted by the first counter $P_{OK}$ meeting or exceeding the number k', and the number Y (1$\leq$Y$\leq$N) of receiving devices that transmit a second transmission interruption request packet responsive to the number counted by the second counter $P_{NG}$ meeting or exceeding the number (n−k'+1), is equal to or greater than a default value N' (<N), and
the transmission controller causes the first transmitter to interrupt the transmission of the coded packets in a case where the number C of set coded packets to be transmitted is zero.

7. The communication system of claim 6,
wherein the transmission number setter selects a smaller value of a predetermined value and a calculation value corresponding to the number X of receiving devices that transmit the first transmission interruption request packet and the number Y of receiving devices that transmit the second transmission interruption request packet, as the number C of coded packets to be transmitted.

8. A receiving device for real time communication with a transmitting device, the receiving device comprising:
a receiver that receives coded packets transmitted from the transmitting device, wherein n (>k) number of coded packets generated from k (k: an integer of 2 or more) number of data packets are transmitted from the transmitting device, with each of the coded packets being transmitted per a defined time period T to achieve real time communication,
a decoder that decodes the received coded packets,
a parameter i indicative of a sequential number of the coded packets received,
a first counter $P_{OK}$ that counts a number of the coded packets that are normally received,
a second counter $P_{NG}$ that counts a number of the coded packets that are abnormally received, a reception controller that,
when the i-th coded packet is received within the defined time period T, determines whether the i-th coded packet is normally received or abnormally received, and increments the first counter $P_{OK}$ by 1 when the i-th coded packet is determined to be normally received and increments the second counter $P_{NG}$ by 1 when the i-th coded packet is determined to be abnormally received,
when the i-th coded packet is not received within the defined time period T, determines the i-th coded packet is lost and increments the second counter $P_{NG}$ by 1, and
a second transmitter that transmits a transmission interruption request packet for requesting transmission interruption of the coded packets to the transmitting device responsive to a number counted by the first counter $P_{OK}$ meeting or exceeding a number k'($\geq$k) indicating that a sufficient number of the coded packets are normally and timely received to achieve real time communication.

9. A communication system for real time communication in which a transmitting device and at least one receiving device are connected to each other,
wherein the transmitting device includes
a packet generator that generates k (k: an integer of 2 or more) number of data packets as transmission targets,
a coder that generates n (>k) number of coded packets by coding the k number of generated data packets,
a transmission controller that instructs that the coded packets are to be transmitted or the transmission of the coded packets is to be interrupted, and
a first transmitter that sequentially transmits the n number of the generated coded packets in response to a transmission instruction from the transmission controller, wherein each of the coded packets is transmitted per a defined time period T to achieve real time communication,
the receiving device includes
a receiver that receives the transmitted coded packets,
a decoder that decodes the received coded packets,
a parameter i indicative of a sequential number of the coded packets received,
a first counter $P_{OK}$ that counts a number of the coded packets that are normally received,
a second counter $P_{NG}$ that counts a number of the coded packets that are abnormally received,
a reception controller that,
when the i-th coded packet is received within the defined time period T, determines whether the i-th coded packet is normally received or abnormally received, and increments the first counter $P_{OK}$ by 1 when the i-th coded packet is determined to be normally received and increments the second counter $P_{NG}$ by 1 when the i-th coded packet is determined to be abnormally received,
when the i-th coded packet is not received within the defined time period T, determines the i-th coded packet is lost and increments the second counter $P_{NG}$ by 1, and
a second transmitter that transmits a transmission interruption request packet for requesting transmission interruption of the coded packets to the transmitting device responsive to a number counted by the second counter $P_{NG}$ meeting or exceeding (n−k'+1) (k$\leq$k'<n) indicating that a sufficient number of the coded packets are not normally and timely received to achieve real time communication, and
the transmission controller of the transmitting device causes the first transmitter to interrupt the transmission of the coded packets in response to the transmission interruption request packet.

10. The communication system of claim 9,
wherein the reception controller instructs the decoder to decode the k number of data packets using the (n−k'+1) number of abnormally received coded packets.

11. The communication system of claim 9,
wherein N (N: an integer of 2 or more) number of receiving devices are connected with the transmitting device,
the transmitting device further includes
a transmission number setter that sets the number B (0$\leq$B<N) of coded packets to be transmitted in a case where the number Y (1$\leq$Y$\leq$N) of receiving devices that transmit the transmission interruption request packet is equal to or greater than a default value N' (<N), and
the transmission controller causes the first transmitter to interrupt the transmission of the coded packets in a case where the number B of set coded packets to be transmitted is zero.

12. The communication system of claim 11,
wherein the transmission number setter selects a smaller value of a predetermined value and a calculation value corresponding to the number Y of receiving devices that transmit the transmission interruption request packet, as the number B of coded packets to be transmitted.

13. The receiving device of claim 8,
wherein the reception controller instructs the decoder to decode the k number of data packets using the k' number of normally received coded packets.

14. The receiving device of claim 8,
wherein the reception controller instructs the second transmitter to transmit the transmission interruption request packet responsive to a number counted by the second counter $P_{NG}$ meeting or exceeding (n−k'+1).

* * * * *